US011398116B2

(12) United States Patent
Tsurumi et al.

(10) Patent No.: US 11,398,116 B2
(45) Date of Patent: Jul. 26, 2022

(54) ANOMALY DETECTION ELECTRONIC CONTROL UNIT, IN-VEHICLE NETWORK SYSTEM, AND ANOMALY DETECTION METHOD

(71) Applicant: Panasonic Intellectual Property Corporation of America, Torrance, CA (US)

(72) Inventors: Junichi Tsurumi, Osaka (JP); Takamitsu Sasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 231 days.

(21) Appl. No.: 16/918,036

(22) Filed: Jul. 1, 2020

(65) Prior Publication Data
US 2020/0334926 A1   Oct. 22, 2020

Related U.S. Application Data

(63) Continuation of application No. PCT/JP2019/018227, filed on May 7, 2019.

(30) Foreign Application Priority Data

May 8, 2018 (JP) .............................. JP2018-090228

(51) Int. Cl.
*G07C 5/00* (2006.01)
*B60W 40/09* (2012.01)
(Continued)

(52) U.S. Cl.
CPC ............. *G07C 5/008* (2013.01); *B60W 40/09* (2013.01); *B60W 50/14* (2013.01); *G06V 20/59* (2022.01);
(Continued)

(58) Field of Classification Search
CPC ....... G07C 5/008; G06V 20/59; B60W 40/09; B60W 50/14; B60W 2556/45; B60W 2720/00
See application file for complete search history.

(56) References Cited

U.S. PATENT DOCUMENTS 11,173,914 B2 * 11/2021 Kim .................. B60W 50/0098
2004/0093146 A1   5/2004 Gustavsson et al.
(Continued)

FOREIGN PATENT DOCUMENTS

| CN | 107031535 | 8/2017 |
| JP | 2017-47835 | 3/2017 |

(Continued)

OTHER PUBLICATIONS

International Search Report dated Jun. 4, 2019 in International (PCT) Application No. PCT/JP2019/018227.
(Continued)

*Primary Examiner* — Ramsey Refai
(74) *Attorney, Agent, or Firm* — Wenderoth, Lind & Ponack, L.L.P.

(57) ABSTRACT

An anomaly detection electronic control unit connected to an in-vehicle network includes: a communicator that receives a first communication message indicating speed information of a vehicle including the in-vehicle network and a second communication message indicating peripheral information of the vehicle; a processor; and a memory including at least one set of instructions that, when executed by the processor causes the processor to perform operations including: (A) determining a first traveling state of the vehicle based on the speed information and a second traveling state of the vehicle based on the peripheral information; (B) determining, by comparing the first traveling state with the second traveling state, that the first communication message is anomalous when the first traveling state is
(Continued)

different from the second traveling state; and (C) executing processing to handle an anomaly when the first communication message is determined to be anomalous.

15 Claims, 7 Drawing Sheets

(51) Int. Cl.
*B60W 50/14* (2020.01)
*G06V 20/59* (2022.01)

(52) U.S. Cl.
CPC ..... *B60W 2556/45* (2020.02); *B60W 2720/00* (2013.01)

(56) References Cited

U.S. PATENT DOCUMENTS

| | | | |
|---|---|---|---|
| 2014/0277830 A1* | 9/2014 | Kwon | B60W 40/09 701/1 |
| 2017/0013005 A1 | 1/2017 | Galula et al. | |
| 2017/0072964 A1 | 3/2017 | Kim | |
| 2017/0278323 A1 | 9/2017 | Gupta et al. | |
| 2019/0141070 A1* | 5/2019 | Tsurumi | H04L 63/1425 |
| 2019/0268360 A1* | 8/2019 | Yamanashi | H04L 63/1425 |
| 2019/0329784 A1 | 10/2019 | Kim | |

FOREIGN PATENT DOCUMENTS

| | | |
|---|---|---|
| TW | 201735669 | 10/2017 |
| WO | 2018/008453 | 1/2018 |

OTHER PUBLICATIONS

Charlie Miller et al., "Remote Exploitation of an Unaltered Passenger Vehicle", Aug. 10, 2015.
Charlie Miller et al., "CAN Message Injection", Jun. 28, 2016.
Office Action and Search Report dated Dec. 9, 2021 in corresponding Chinese Patent Application No. 201980003808.6, with English language translation of Search Report.
Extended European Search Report dated Jul. 8, 2021 in corresponding European Patent Application No. 19799873.5.

* cited by examiner

FIG. 2

| SOF | ID FIELD | RTR | IDE | r | DLC | DATA FIELD | CRC | DEL | ACK | DEL | EOF |

| | | FIRST TRAVELING STATE | | |
|---|---|---|---|---|
| | | STOPPED STATE | LOW-SPEED TRAVELING STATE | HIGH-SPEED TRAVELING STATE |
| SECOND TRAVELING STATE | STOPPED STATE | LEVEL 0 | LEVEL 1 | LEVEL 2 |
| | LOW-SPEED TRAVELING STATE | LEVEL 1 | LEVEL 0 | LEVEL 1 |
| | HIGH-SPEED TRAVELING STATE | LEVEL 3 | LEVEL 1 | LEVEL 0 |

| RECEPTION ID LIST |
|---|
| 1 |
| 3 |
| 4 |
| 5 |
| 6 |

ANOMALY DETECTION ELECTRONIC CONTROL UNIT, IN-VEHICLE NETWORK SYSTEM, AND ANOMALY DETECTION METHOD

CROSS REFERENCE TO RELATED APPLICATIONS

This application is a U.S. continuation application of PCT International Patent Application Number PCT/JP2019/018227 filed on May 7, 2019, claiming the benefit of priority of Japanese Patent Application Number 2018-090228 filed on May 8, 2018, the entire contents of which are hereby incorporated by reference.

BACKGROUND

1. Technical Field

The present disclosure relates to a security technology of detecting and handling a false message transmitted over, for example, an in-vehicle network.

2. Description of the Related Art

Recent automobiles are equipped with multiple devices called "electronic control units (ECUs)". A network connecting these ECUs is called an "in-vehicle network". Many communication standards have been developed for such an in-vehicle network. One of the most leading communication standards used for the in-vehicle networks is a Controller Area Network (CAN) defined by ISO-11898.

An in-vehicle network based on a CAN standard (such a network is also referred to as a "CAN network" hereinafter) includes a communication channel (bus) having two cables. ECUs connected to the bus are also referred to as "nodes". Each of the nodes connected to the bus transmits and receives data in a unit called a frame or a message. The CAN network uses no identifier indicating a receiver or transmitter of data.

A node transmitting a message (hereinafter, also referred to as a transmission node) transmits each message together with an ID called a message ID indicating a message type. More specifically, this node transmits a signal to the bus. A node receiving a message (hereinafter, also referred to as a reception node) receives only a message that includes a predetermined message ID. More specifically, this node reads a signal from the bus. Messages with the same ID are transmitted in a predetermined fixed cycle.

As described above, the multiple ECUs included in a system of an automobile operate by exchanging various messages with one another via the CAN network connecting these ECUs.

An ECU having a function of communicating with a source outside the CAN network may be taken over through, for example, an attack from the outside. Then, this ECU may transmit a false message to the CAN network. Such a taken-over ECU (hereinafter, also referred to as an unauthorized ECU) is capable of masquerading as a different ECU to transmit a false message to improperly control the automobile.

To address this issue, a method used by an attacker to access a CAN network and transmit a false message to improperly control an ECU has been disclosed.

For example, Charlie Miller & Chris Valasek, Remote Exploitation of an Unaltered Passenger Vehicle, 2015 Aug. 10 (Non-Patent Literature (NPL) 1) discloses a false remote-control operation that can considerably affect a vehicle. In this operation, an attacker uses an authorized diagnostic device to transmit a false vehicle diagnostic message from a port for connecting to a diagnostic device that diagnoses the vehicle.

Moreover, Charlie Miller & Chris Valasek, CAN Message Injection, 2016 Jun. 28 (NPL 2) discloses that some automotive manufacturers take security measures against an attack disclosed in NPL 1 by rejecting a diagnostic message while an automobile is moving. NPL 2 also discloses that an attacker may falsify information about the speed of the automobile and then transmit this falsified information. Such falsified information can mislead the automobile, which is currently moving, into false recognition that the automobile is currently stopped. As disclosed in NPL 2, this may allow reception of even a diagnostic message containing contents that endanger the automobile if received and followed while the automobile is moving.

SUMMARY

The attack by the aforementioned method may considerably affect control of the vehicle that is moving, and thus lead to incidents, such as an accident. To address such an attack, measures enabling appropriate detection and handling need to be taken.

The present disclosure provides an anomaly detection electronic control unit (anomaly detection ECU), an in-vehicle network system, and an anomaly detection method, with which an anomaly leading to such an attack is detected and appropriately handled.

In order to achieve the aforementioned object, an anomaly detection ECU according to an aspect of the present disclosure is an anomaly detection electronic control unit that is connected to an in-vehicle network used by a plurality of electronic control units for communication, and includes: a communicator that receives a first communication message indicating speed information of a vehicle including the in-vehicle network and a second communication message indicating peripheral information of the vehicle; a processor; and a memory including at least one set of instructions that, when executed by the processor causes the processor to perform operations including: (A) determining a first traveling state of the vehicle based on the speed information and a second traveling state of the vehicle based on the peripheral information; (B) determining, by comparing the first traveling state with the second traveling state, that the first communication message is anomalous when the first traveling state is different from the second traveling state and that the first communication message is normal when the first traveling state is same as the second traveling state; and (C) executing processing to handle an anomaly when the first communication message is determined to be anomalous in operation (B).

Furthermore, an in-vehicle network system according to an aspect of the present disclosure includes: a plurality of electronic control units communicating via an in-vehicle network; and an anomaly detection electronic control unit connected to the in-vehicle network, wherein the plurality of electronic control units includes a first electronic control unit, a second electronic control unit, a third electronic control unit, and an external communication device communicating with an external network, the first electronic control unit transmits, to the in-vehicle network, a first communication message indicating speed information of a vehicle including the in-vehicle network, the external communication device transmits, to the in-vehicle network, an external message received from the external network, the second electronic control unit transmits, to the in-vehicle network, a second communication message indicating peripheral information of the vehicle, the third electronic control unit holds, when receiving the first communication message, a value of the first communication message, and performs, when receiving the external message, processing appropriate to the external message in accordance with the value of the first communication message held, and the anomaly detection electronic control unit includes: a communicator that receives the first communication message and the second communication message; a processor; and a memory including at least one set of instructions that, when executed by the processor causes the processor to perform operations including: (A) determining a first traveling state of the vehicle based on the speed information and a second traveling state of the vehicle based on the peripheral information; (B) determining, by comparing the first traveling state with the second traveling state, that the first communication message is anomalous when the first traveling state is different from the second traveling state and that the first communication message is normal when the first traveling state is same as the second traveling state; and (C) executing processing to handle an anomaly when the first communication message is determined to be anomalous.

Furthermore, an anomaly detection method according to an aspect of the present disclosure is an anomaly detection method that is performed by an anomaly detection electronic control unit connected to an in-vehicle network used by a plurality of electronic control units for communication, and includes: receiving a first communication message indicating speed information of a vehicle including the in-vehicle network and a second communication message indicating peripheral information of the vehicle; determining a first traveling state of the vehicle based on the speed information and a second traveling state of the vehicle based on the peripheral information; determining, by comparing the first traveling state with the second traveling state, that the first communication message is anomalous when the first traveling state is different from the second traveling state and that the first communication message is normal when the first traveling state is same as the second traveling state; and executing processing to handle an anomaly when the first communication message is determined to be anomalous.

Note that these generic or specific aspects may be implemented as an integrated circuit, a computer program, or a computer-readable recording medium such as a CD-ROM, or may be implemented as any combination of an apparatus, a system, a method, an integrated circuit, a computer program, and a recording medium.

The present disclosure is capable of detecting and handling an anomaly caused by an attack including transmission of a message, which indicates falsified speed information, to an in-vehicle network.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 illustrates a format of a data frame based on a CAN protocol according to Embodiment;

DETAILED DESCRIPTION OF THE EMBODIMENT

Figure 1:
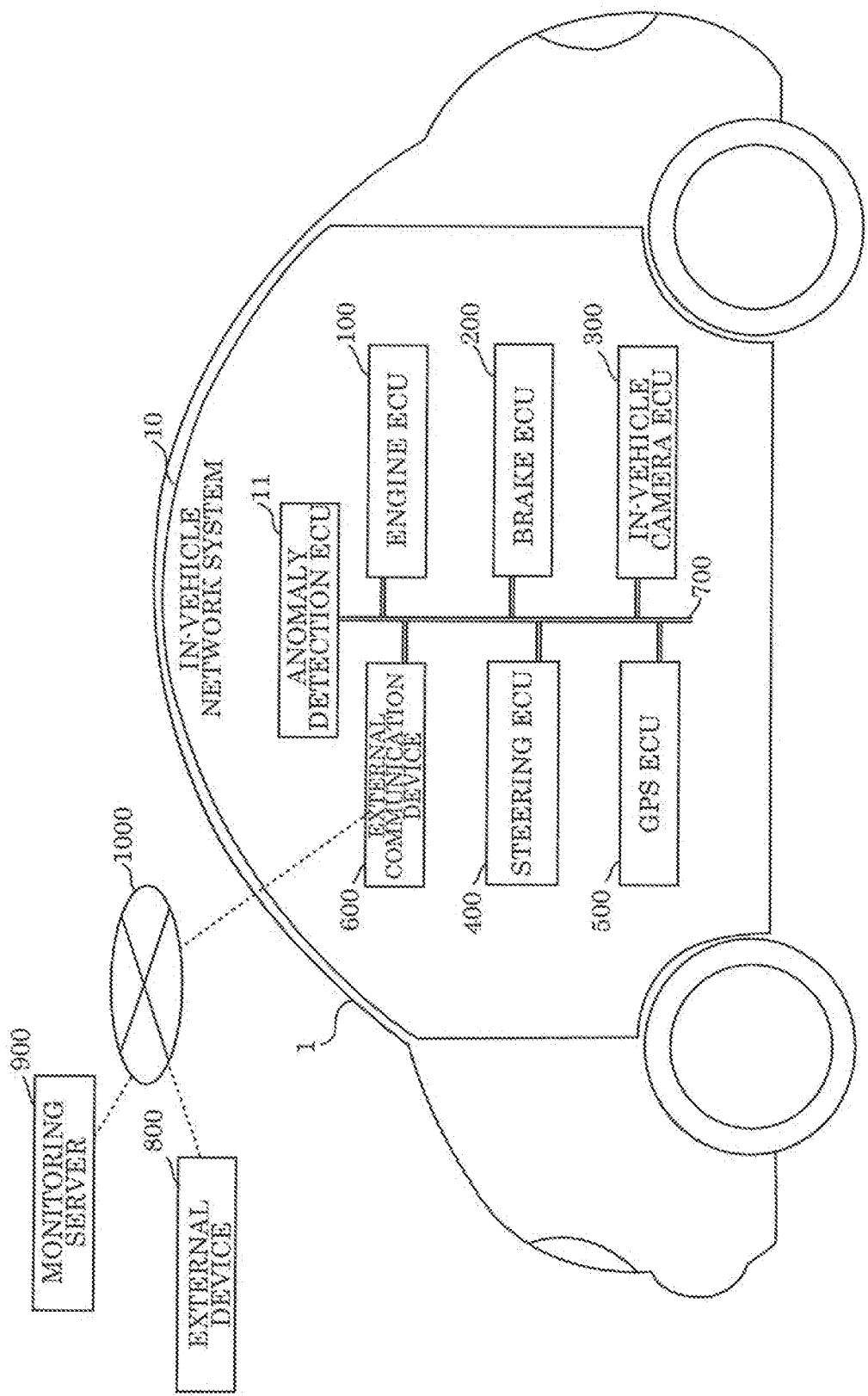
FIG. 1 illustrates an overall configuration of an in-vehicle network system according to Embodiment.

An anomaly detection electronic control unit according to an aspect of the present disclosure is an anomaly detection electronic control unit that is connected to an in-vehicle network used by a plurality of electronic control units for communication, and includes: a receiver that receives a first communication message indicating speed information of a vehicle including the in-vehicle network and a second communication message indicating peripheral information of the vehicle; a traveling-state determiner that determines a first traveling state of the vehicle based on the speed information and a second traveling state of the vehicle based on the peripheral information; an anomaly determiner that determines, by comparing the first traveling state with the second traveling state, that the first communication message is anomalous when the first traveling state is different from the second traveling state and that the first communication message is normal when the first traveling state is same as the second traveling state; and an anomaly processor that executes processing to handle an anomaly when the anomaly determiner determines that the first communication message is anomalous.

With this configuration, even if a false message including information indicating a falsified speed of the vehicle is transmitted to the in-vehicle network, an anomaly of this message can be appropriately detected and handled.

For example, the traveling-state determiner may express the first traveling state using one of at least three stages, which are a high-speed traveling state, a low-speed traveling state, and a stopped state, depending on a speed of the vehicle indicated by the speed information, the traveling-state determiner may further express the second traveling state using one of at least three stages, which are a high-speed traveling state, a low-speed traveling state, and a stopped state, depending on the speed of the vehicle indicated by the peripheral information, the anomaly determiner may determine a level of anomaly possibility of the first communication message based on a level of difference between the one of the at least three stages that indicates the first traveling state and the one of the at least three stages that indicates the second traveling state, and the anomaly processor may perform the processing that is different depending on the level of anomaly possibility.

This configuration enables handling appropriate to the level of anomaly possibility determined for the vehicle. For example, the processing may include notifying the user of the vehicle about the occurrence of the anomaly. For example, the processing may include instructing an intervention in a driving operation of the vehicle.

For example, when the first traveling state is different from the second traveling state, and the second traveling state is currently the high-speed traveling state, the anomaly determiner may determine the level of anomaly possibility to be higher than when the second traveling state is currently the low-speed traveling state.

As the speed of the vehicle increases, the vehicle typically has a higher risk of, for example, an accident that leads to a greater damage. By determining the level of anomaly possibility to be higher for the vehicle traveling at a higher speed, appropriate handling can be executed.

For example, the second communication message may indicate at least three types of peripheral information, and when traveling states obtained as results of determination made based on each of the at least three types of the peripheral information include different traveling states, the traveling-state determiner may determine, as the second traveling state, a traveling state that is determined most among the traveling states determined based on each of the at least three types of the peripheral information. Furthermore, when at least two traveling states are determined most among the traveling states obtained as the results of determination made based on each of the at least three types of the peripheral information and total numbers of the at least two traveling states determined most are same, the traveling-state determiner may determine, as the second traveling state, the traveling state determined using the second communication message that is newest, from among the at least two most-determined traveling states.

This configuration allows verification to be performed on the information indicating the traveling state, using different information. Thus, even for the information indicating a falsified traveling state, the chance of accurately detecting this anomaly can be increased.

For example, the second communication message may include image information of an image captured by an in-vehicle camera included in the vehicle, and the traveling-state determiner may determine the traveling state of the vehicle using the image information. Furthermore, the second communication message may include contact time information indicating a time of day when a user of the vehicle contacts at least one of a steering wheel, an accelerator pedal, or a car seat, and the traveling-state determiner may determine the traveling state of the vehicle using the contact time information. Moreover, the second communication message may include current location information indicating a current location of the vehicle, and the traveling-state determiner may determine the traveling state of the vehicle using the current location information.

With this configuration, the traveling state of the vehicle can be estimated using the related information. Thus, even if the information indicating a falsified traveling state is transmitted over the in-vehicle network, the chance of accurately detecting this anomaly can be increased.

For example, the in-vehicle network may be further connected to an external communication device that communicates with an external network, the receiver may receive an external message received by the external communication device from the external network, and the anomaly processor may further invalidate the external message when the first communication message is determined to be anomalous.

This configuration reduces an effect of an attack carried out by injecting a false message using a channel, such as a diagnostic port.

For example, the in-vehicle network may be further connected to an external communication device that communicates with an external network, the external communication device may be connected to a monitoring server via the external network, and the anomaly processor may transmit, to the monitoring server, a result of determination made by the anomaly determiner.

This configuration allows information about a cyberattack against one automobile to be used as a shared asset for security measures of multiple automobiles.

For example, when the receiver has not received at least one of the first communication message or the second communication message, the anomaly determiner may determine the level of anomaly possibility to be higher than when the receiver receives both the first communication message and the second communication message.

With this configuration, even if information to be used for verification of the information indicating the traveling state is unavailable due to a cyberattack, safer handling can be executed.

An in-vehicle network system according to an aspect of the present disclosure is an in-vehicle network system including: a plurality of electronic control units communicating via an in-vehicle network; and an anomaly detection electronic control unit connected to the in-vehicle network, wherein the plurality of electronic control units include a first electronic control unit, a second electronic control unit, a third electronic control unit, and an external communication device communicating with an external network, the first electronic control unit transmits, to the in-vehicle network, a first communication message indicating speed information of a vehicle including the in-vehicle network, the external communication device transmits, to the in-vehicle network, an external message received from the external network, the second electronic control unit transmits, to the in-vehicle network, a second communication message indicating peripheral information of the vehicle, the third electronic control unit holds, when receiving the first communication message, a value of the first communication message, and performs, when receiving the external message, processing appropriate to the external message in accordance with the value of the first communication message held, and the anomaly detection electronic control unit includes: a receiver that receives the first communication message and the second communication message; a traveling-state determiner that determines a first traveling state of the vehicle based on the speed information and a second traveling state of the vehicle based on the peripheral information; an anomaly determiner that determines, by comparing the first traveling state with the second traveling state, that the first communication message is anomalous when the first traveling state is different from the second traveling state and that the first communication message is normal when the first traveling state is same as the second traveling state; and an anomaly processor that executes processing to handle an anomaly when the first communication message is determined to be anomalous.

With this configuration, even if a false message including information indicating a falsified speed of the vehicle is transmitted to the in-vehicle network, an anomaly of this message can be appropriately detected and handled.

An anomaly detection method according to an aspect of the present disclosure is an anomaly detection method that is performed by an anomaly detection electronic control unit connected to an in-vehicle network used by a plurality of electronic control units for communication, and includes: receiving a first communication message indicating speed information of a vehicle including the in-vehicle network and a second communication message indicating peripheral information of the vehicle; determining a first traveling state of the vehicle based on the speed information and a second traveling state of the vehicle based on the peripheral information; determining, by comparing the first traveling state with the second traveling state, that the first communication message is anomalous when the first traveling state is different from the second traveling state and that the first communication message is normal when the first traveling state is same as the second traveling state; and executing processing to handle an anomaly when the first communication message is determined to be anomalous.

With this configuration, even if a false message including information indicating a falsified speed of the vehicle is transmitted to the in-vehicle network, an anomaly of this message can be appropriately detected and handled.

Hereinafter, an anomaly detection electronic control unit, an anomaly detection system, and an anomaly detection method according to the present disclosure will be described in detail with reference to the drawings. Note that each of the following embodiments shows a specific example of the present disclosure. Therefore, the numerical values, shapes, materials, structural components, the arrangement and connection of the structural components, steps, the processing order of the steps, etc., shown in the following embodiments are mere examples, and thus are not intended to limit the present disclosure. Furthermore, among the structural components described in the following embodiments, structural components not recited in any one of the independent claims are not necessarily needed in order to achieve the aforementioned object but are described as structural components included in a preferred embodiment.

It should be noted that the enclosed drawings and subsequent description are provided in order for a skilled person to sufficiently understand the present disclosure, and are not intended to limit the subject matter recited in the claims.

Furthermore, the respective figures are schematic and are not necessarily precise illustrations. In the respective figures, elements that are substantially the same are assigned the same reference sign, and overlapping description may be omitted or simplified.

Embodiment

An in-vehicle network system according to the present embodiment is described with reference to the drawings.

1. Configuration

Hereinafter, the in-vehicle network system according to the present embodiment is described with reference to the drawings. The in-vehicle network system includes an anomaly detection ECU that: determines a traveling state of a vehicle from multiple perspectives using a plurality of types of messages transmitted to the in-vehicle network; determines whether speed information of the vehicle is falsified, on the basis of the determined traveling state of the vehicle; and implements an anomaly detection method to inhibit execution of processing that is based on a falsified message.

[1.1 Overall Configuration of In-vehicle Network System]

FIG. 1 illustrates an overall configuration of an in-vehicle network system according to the present embodiment. As illustrated in FIG. 1, in-vehicle network system 10 includes anomaly detection ECU 11, engine ECU 100, brake ECU 200, in-vehicle camera ECU 300, steering ECU 400, global positioning system (GPS) ECU 500, and external communication device 600. These components are connected via in-vehicle network 700. In-vehicle network 700 is a CAN network. In-vehicle network system 10 is mounted on vehicle 1, which is an automobile.

Although omitted from FIG. 1, in-vehicle network system 10 includes more ECUs in addition to the aforementioned ECUs. For the purpose of convenience, the aforementioned ECUs are mainly described. Some of the ECUs illustrated in FIG. 1 may be connected to various devices, such as a sensor and an actuator. However, graphical representation or complete description of these devices is omitted for the purpose of convenience, and thus these devices are mentioned as necessary in the following description.

Each of the aforementioned ECUs is a device that includes a processor (a microprocessor), a digital circuit like a memory, an analog circuit, and a communication circuit, for example. The memory includes a ROM and a RAM, and is capable of storing a control program (a computer program) to be executed by the processor. For example, the processor operates according to the control program, so that the ECU achieves various functions. The computer program includes a plurality of instruction codes indicating instructions to be given to the processor to achieve a predetermined function.

The present embodiment is described on the understanding that in-vehicle network 700 may be connected to an unauthorized ECU that transmits a false message.

In-vehicle network system 10 is connected to external device 800 and monitoring server 900 via external network 1000.

Anomaly detection ECU 11 determines an anomaly possibility for a message indicating speed information, among messages transmitted to in-vehicle network 700. Anomaly detection ECU 11 has a function of performing predetermined handling appropriate to a level of anomaly possibility. A detailed configuration of anomaly detection ECU 11 is described later.

Engine ECU 100 is connected to an engine (not shown) of vehicle 1 and obtains, from the engine, the speed information indicating a speed of vehicle 1. Then, engine ECU 100 attaches a predetermined ID to the message indicating the obtained speed information and transmits this message to in-vehicle network 700 periodically. For example, a value representing the ID attached to the message indicating the speed information is "1". The speed information indicates a speed of kilometers per hour (km/h), and a value representing the speed information is 0 km/h. This message indicating the speed information is an example of a first communication message according to the present embodiment.

Brake ECU 200 is connected to a brake of vehicle 1 and obtains, from the brake, brake information indicating an application level of the brake. The application level is expressed as a percentage. For example, the application level indicated by the brake information is represented as 100% for full application of the brake and as 0% for no application of the brake. Brake ECU 200 attaches a predetermined ID to the message indicating the obtained brake information and transmits this message to in-vehicle network 700 periodically. For example, a value representing the ID attached to the message indicating the brake information is "2". A value representing the brake information indicated by this message is 50%. In the present embodiment, a diagnostic message may be transmitted to brake ECU 200 from the outside, for example.

In-vehicle camera ECU 300 is connected to, for example, an in-vehicle camera mounted in a position enabling capture of a view ahead of vehicle 1 in a traveling direction of vehicle 1. In-vehicle camera ECU 300 obtains image data indicating an image captured by the in-vehicle camera, and also obtains information about the obtained image data. Then, in-vehicle camera 300 attaches a predetermined ID to the message indicating this information and transmits this message to in-vehicle network 700 periodically. For example, a value representing the ID attached to the message indicating the information about the image data is "3". The value representing the information about the image data indicated by this message is, for example, a value of feature amount expressing a feature of the image in numerical form. This feature amount is an example of peripheral information used by anomaly detection ECU 11 for determining the traveling state of vehicle 1 as described later. In the following description, the image information also refers to this feature amount of the image. The message indicating this image information is an example of a second communication message according to the present embodiment.

Steering ECU 400 is connected to a steering wheel of vehicle 1 and obtains, from the steering wheel, contact time information indicating a latest time of day when a user of vehicle 1 contacts the steering wheel. Then, steering ECU 400 attaches a predetermined ID to the message indicating the obtained contact time information and transmits this message to in-vehicle network 700 periodically. For example, a value representing the ID attached to the message indicating the contact time information is "4". A value of the contact time information indicated by this message is "Apr. 17, 2018 at 19:42:30". This contact time information is an example of the peripheral information used by anomaly detection ECU 11 for determining the traveling state of vehicle 1 as described later. This message indicating the contact time information is an example of the second communication message according to the present embodiment.

GPS ECU 500 is connected to a GPS receiver mounted on vehicle 1 and obtains, from the GPS receiver, current location information indicating coordinates of a current location of vehicle 1. Then, GPS ECU 500 attaches a predetermined ID to the message indicating the obtained current location information and transmits this message to in-vehicle network 700 periodically. For example, a value representing the ID attached to the message indicating the current location information is "5". The current location information of this message indicates "(latitude, longitude)", and a value of this current location information is "(34.741567, 135.571486)". This current location information is an example of the peripheral information used by anomaly detection ECU 11 for determining the traveling state of vehicle 1 as described later. This message indicating the current location information is an example of the second communication message according to the present embodiment.

Each of the ECUs reads, from in-vehicle network 700, messages transmitted by the other ECUs and selectively receives a message depending on the ID attached to the message.

External communication device 600 mediates communication between the outside of vehicle 1 and in-vehicle network 700. More specifically, external communication device 600 receives data from the outside of vehicle 1, and attaches a predetermined ID to the message indicating the received data according to the type of this data. Then, external communication device 600 transmits this message to in-vehicle network 700. Moreover, external communication device 600 reads messages transmitted from the ECUs to in-vehicle network 700, and selectively receives a message depending on the ID attached to the message. Then, external communication device 600 transmits information included in the message to the outside of vehicle 1 as necessary. FIG. 1 illustrates that external communication device 600 communicates as described above with external device 800 and monitoring server 900 located outside vehicle 1, via external network 1000.

External network 1000 is a communication network used for communication between external communication device 600 and each of external device 800 and monitoring server 900. External network 1000 may use either one of or both wired and wireless communication methods. A wireless communication method may be implemented using an existing technology, such as Wi-Fi (registered trademark), 3G, or Long-Term Evolution (LTE), or using a newer technology.

External device 800 is a failure diagnostic device (also referred to as a diagnostic tool) for an automobile, for example. External device 800 transmits a message (referred to as a diagnostic message in the present disclosure) for diagnosis of a component, such as the engine or brake, mounted on vehicle 1. External communication device 600 of in-vehicle network system 10 receives the diagnostic message and then transmits this message to in-vehicle network 700. The diagnostic message may instruct a device included in the vehicle to execute a specific operation. For example, when external communication device 600 receives a diagnostic message instructing the brake to execute a specific operation, brake ECU 200 receives this diagnostic message via in-vehicle network 700. Brake ECU 200 controls the brake according to an instruction for the specific operation indicated by the diagnostic message.

Monitoring server 900 communicates with external communication device 600 via external network 1000 to, for example, obtain information about an anomaly occurring to in-vehicle network system 10.

[1.2. Format of Message]

Figure 2:
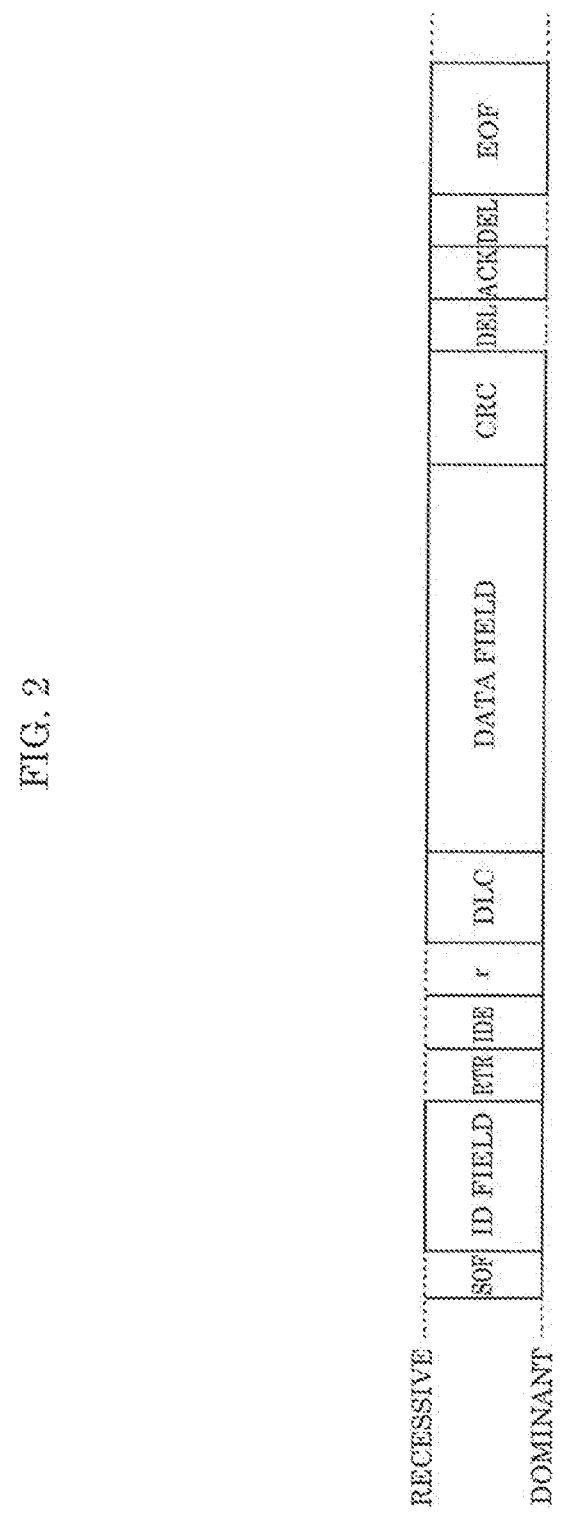

FIG. 2 illustrates a format of a message based on a CAN protocol. This diagram illustrates a format of a message as a data frame in a standard ID format based on the CAN protocol.

The message as the data frame includes a plurality of fields. The plurality of fields include: a Start Of Frame (also referred to as "SOF" in the diagram and in the following description); an ID field; a Remote Transmission Request (also referred to as "RTR" in the diagram and in the following description); an IDentifier Extension (also referred to as "IDE" in the diagram and in the following description); a reserved bit (also referred to as "r" in the diagram and in the following description); a data length code (also referred to as "DLC" in the diagram and in the following description); a data field; a Cyclic Redundancy Check (also referred to as "CRC" in the diagram and in the following description) sequence; a CRC delimiter ("DEL" on the left-hand side in the diagram); an Acknowledgement (also referred to as "ACK" in the diagram and in the following description) slot; an ACK delimiter ("DEL" on the right-hand side in the diagram); and an End of Frame (also referred to as "EOF" in the diagram and in the following description).

SOF is a 1-bit dominant. Dominant (having a higher priority) refers to a state of a bus, which has two cables, applied with a voltage to transmit a value "0" to the two cables in in-vehicle network 700 that uses a digital method for data transmission, or refers to this value "0". In contrast, recessive (having a lower priority) refers to a state of the bus applied with a voltage to transmit a value "1" to the two cables, or refers to this value "1". The terms "dominant" and "recessive" indicate a relationship between these two values. Thus, if the values "0" and "1" are transmitted simultaneously from two nodes of in-vehicle network system 10 to the bus of in-vehicle network 700, the value "0" is prioritized. The state of the bus is recessive during idle time. An ECU changes the state of the bus from recessive to dominant to start transmission of a message. By reading this change, the other ECUs are synchronized. In FIG. 2, each field in the message has a top line for dominant and a bottom line for recessive. A solid line denotes that the present field is capable of taking on a value of dominant or recessive for which the line is solid. For example, the value of SOF is only dominant. Thus, SOF in FIG. 2 has a solid line for dominant and a dashed line for recessive.

The ID field includes an ID represented by an 11-bit value indicating the type of data included in the message. The CAN is designed to prioritize a message having a smaller ID value, for communication arbitration between messages transmitted simultaneously from at least two nodes.

RTR is a 1-bit dominant indicating the message is a data frame.

Each of IDE and r is a 1-bit dominant.

DLC is a 4-bit value indicating a length of the data field that follows.

The data field is a value indicating the data to be transmitted. A maximum length of the data field is 64 bits, and the length is adjustable in unit of 8 bits. Specifications for assignment of the transmitted data into this part depend on the vehicle type or vehicle manufacturer.

The CRC sequence is a 15-bit value calculated from transmission values of the preceding fields including the SOF, the ID field, the control field, and the data field in this message.

The CRC delimiter is a 1-bit delimiter fixed as a recessive and indicates an end of the CRC sequence. A reception node determines whether the message has been normally received, by comparing the value of the CRC sequence with the result calculated from the values of the SOF, the ID field, the control field, and the data field in the received message.

The ACK slot has a 1-bit length. A transmission node transmits a recessive from this slot. At this same time, the reception node transmits a dominant as an acknowledgement response if the fields from the beginning to the CRC sequence have been normally received. Here, a dominant state of the bus is prioritized. Thus, if one message from the beginning to the CRC sequence has been normally transmitted, the state of the bus is dominant at the time of the transmission of the ACK slot.

The ACK delimiter is a 1-bit delimiter fixed as recessive and indicates an end of the ACK slot.

EOF is a 7-bit value fixed as recessive and indicates an end of the message.

To facilitate the understanding of the description of the present embodiment below, the format of a message as a data frame defined by the CAN has been described above. The CAN also supports a remote frame, an overload frame, and an error frame, as message formats. A remote frame is used as a frame requesting the transmission of a data frame. An overload frame is used to inject a delay before a start of a frame that follows. The error frame is transmitted when any node detects any types of error, and interrupts the transmission of a latest frame on the CAN network. Detailed description on these formats, aside from the data frame, is omitted.

[1.3. Configuration of Anomaly Detection ECU]

Figures 3, 4:
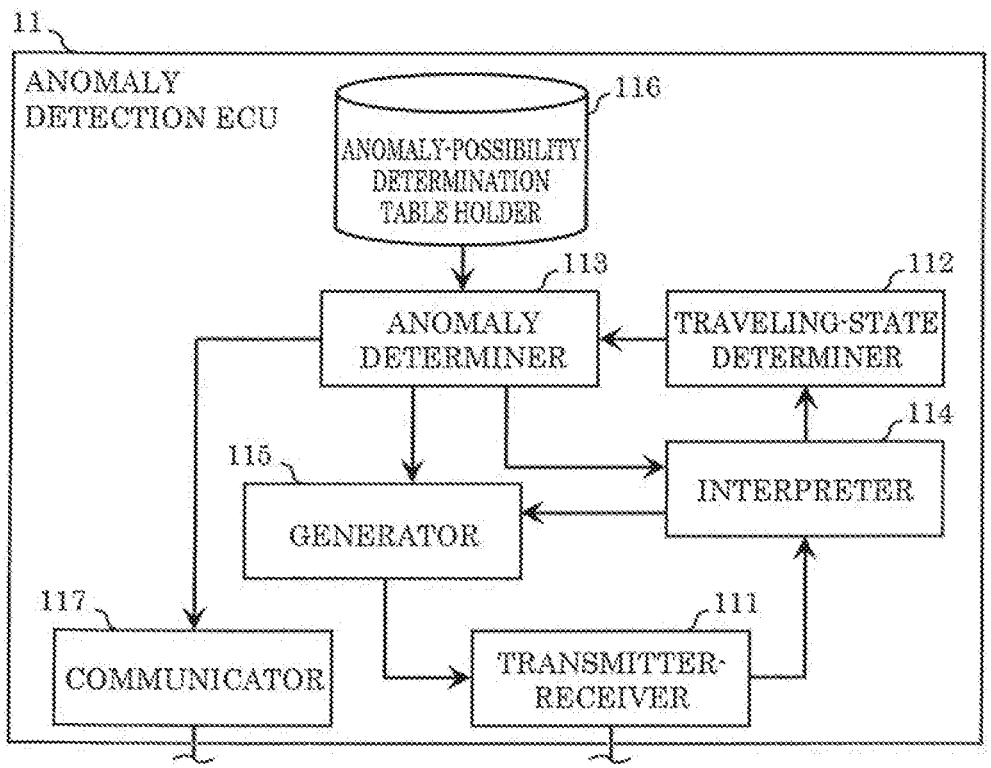
FIG. 3 illustrates a configuration of an anomaly detection ECU according to Embodiment.
FIG. 4 illustrates an example of an anomaly-possibility determination table according to Embodiment.

Next, a configuration of anomaly detection ECU 11 is described in detail. FIG. 3 illustrates the configuration of anomaly detection ECU 11 according to the present embodiment. As illustrated in FIG. 3, anomaly detection ECU 11 includes transmitter-receiver 111, traveling-state determiner 112, anomaly determiner 113, interpreter 114, generator 115, anomaly-possibility determination table holder 116, and communicator 117.

Anomaly detection ECU 11 is a device that includes a processor (a microprocessor), a digital circuit like a memory, an analog circuit, and a communication circuit, for example. The memory includes a ROM and a RAM, and is capable of storing a control program (a computer program) to be executed by the processor. For example, the processor operates according to the control program, so that anomaly detection ECU 11 achieves various functions. The aforementioned components of anomaly detection ECU 11 are functional components implemented by the processor executing one or more computer programs stored in the memory, for example. The computer program includes a plurality of instruction codes indicating instructions to be given to the processor to achieve a predetermined function.

Transmitter-receiver 111 transmits and receives messages based on the CAN protocol to and from in-vehicle network 700. To be more specific, when transmission of a message starts on in-vehicle network 700, transmitter-receiver 111 functions as a receiver, so to speak, that receives the message. Transmitter-receiver 111 also functions as a transmitter, so to speak, that transmits a message or the like to in-vehicle network 700 in response to a result of processing performed by anomaly detection ECU 11. More specifically, transmitter-receiver 111 receives the message one bit at a time from in-vehicle network 700 and then transfers the message to interpreter 114. Transmitter-receiver 111 also transmits, to in-vehicle network 700, contents of the message notified by generator 115.

Interpreter 114 receives bit values included in the message from transmitter-receiver 111, and then interprets and maps the values into the fields in the aforementioned message format defined by the CAN protocol. Interpreter 114 transfers the value of the ID field of the message and the data field present after the ID field, to traveling-state determiner 112.

Traveling-state determiner 112 receives the value of the ID field notified by interpreter 114, and determines whether the value of the ID field is a predetermined value.

This predetermined value refers to an ID value representing that the received message indicates any one of speed information, the image information, contact time information, and current location information. To be more specific, traveling-state determiner 112 determines whether the ID value is any one of "1", "3", "4", and "5".

If determining that the ID value of the received message is the predetermined value, traveling-state determiner 112 determines the traveling state of vehicle 1 on the basis of the value in the data field of this message. The traveling state of vehicle 1 to be determined by traveling-state determiner 112 is expressed using three stages, which are a stopped state, a low-speed traveling state, and a high-speed traveling state. The determination of the traveling state of vehicle 1 made by traveling-state determiner 112 is described specifically later.

If receiving the message having the ID value of "1", that is, the message indicating the speed information, traveling-state determiner 112 determines the traveling state of vehicle 1 on the basis of a speed of vehicle 1 indicated by the speed information.

Suppose that traveling-state determiner 112 receives the messages having the ID values of "3", "4", and "5", that is, the messages respectively indicating the image information, the contact time information, and the current location information, each of which is a peripheral information item. In this case, traveling-state determiner 112 first determines the traveling state of vehicle 1 for each of these peripheral information items. Then, using the traveling states obtained as the results of determination, traveling-state determiner 112 determines the traveling state of vehicle 1 indicated by the peripheral information. More specifically, if at least two states among the three traveling states of vehicle 1 determined on the basis of the three peripheral information items are the same, traveling-state determiner 112 determines this same traveling state as the traveling state of vehicle 1 indicated by the peripheral information. Suppose that the traveling states of vehicle 1 determined on the basis of the three messages are all different. In this case, traveling-state determiner 112 determines, as the traveling state of vehicle 1 indicated by the peripheral information, the traveling state of vehicle 1 determined based on the peripheral information of the message having the latest reception time.

Traveling-state determiner 112 notifies anomaly determiner 113 of the traveling states determined based on the speed information and the peripheral information as described above. In this way, the traveling states are notified to anomaly determiner 113 by traveling-state determiner 112. Here, among these traveling states, the traveling state of vehicle 1 determined based on the speed information is an example of a first traveling state according to the present embodiment. Moreover, the traveling state of vehicle 1 determined based on at least one item of the peripheral information is an example of a second traveling state according to the present embodiment.

On the basis of the first traveling state and the second traveling state notified by traveling-state determiner 112, anomaly determiner 113 determines the level of possibility that the message indicating the speed information transmitted to in-vehicle network 700 (a first communication message) is anomalous. For example, the level of anomaly possibility in the present embodiment is expressed using four levels, which are level 0 (not anomalous), level 1 (anomaly possibility: low), level 2 (anomaly possibility: medium), and level 3 (anomaly possibility: high). Anomaly determiner 113 determines the anomaly possibility with reference to an anomaly-possibility determination table (see FIG. 4), for example. Anomaly-possibility determination table holder 116 holds this anomaly-possibility determination table. The anomaly-possibility determination table is described later.

Note that if the first communication message to be transmitted to in-vehicle network 700 has the data field including the speed information obtained by engine ECU 100 from the engine as described above, this first communication message is normal. A first communication message that is anomalous may be transmitted to in-vehicle network 700 when, for example, engine ECU 100 taken over by an attacker transmits a message including false speed information to in-vehicle network 700. As another example, an ECU set up by an attacker may masquerade as engine ECU 100 and then transmit a message including false speed information to in-vehicle network 700. As yet another example, such a set-up ECU may masquerade as an external device, like a diagnostic tool, and then inject a message including false speed information to in-vehicle network 700 via external communication device 600.

Anomaly determiner 113 executes processing appropriate to the level of anomaly possibility. For example, if determining that the anomaly possibility is at level 3, anomaly determiner 113 may notify interpreter 114 that the anomaly possibility is at level 3. If determining that the anomaly possibility is at level 2 or 3, anomaly determiner 113 may provide notification instructing generator 115 to transmit an error-occurrence indication message indicating occurrence of an anomaly. For example, an ID attached to this error-occurrence indication message may be predetermined. Thus, when receiving the message having this ID, a head unit (not shown) of vehicle 1 may provide a predetermined error-occurrence indication to the user of vehicle 1. For example, if determining that the message indicating the speed information is anomalous, or more specifically, if the determined level of anomaly possibility is at level 1 or higher, anomaly determiner 113 may provide notification instructing generator 115 to transmit a message indicating occurrence of an anomaly to in-vehicle network 700. For example, an ID attached to the message transmitted to notify other ECUs of the occurrence of an anomaly may be predetermined. Thus, the message having this ID may be included in reception ID lists, described later, of all the ECUs connected to in-vehicle network 700. If there is a possibility of anomaly, anomaly determiner 113 may generate a log using information related to a plurality of messages received and used for determination, such as contents and reception times of the received messages. Then, anomaly determiner 113 may transmit the generated log to communicator 117. For example, if the determined level of anomaly possibility is at a predetermined level or higher, anomaly determiner 113 may provide notification instructing generator 115 to generate and transmit a message instructing restriction or execution of a predetermined function of another ECU, such as a message instructing an intervention in a driving operation of vehicle 1 or a message invalidating the message (i.e., an error message).

Examples of these processes performed to handle the anomalies in response to the determined levels of anomaly possibility are described later.

Communicator 117 provides notification instructing external communication device 600 to transmit, to monitoring server 900, the log received from anomaly determiner 113.

In accordance with the notification from anomaly determiner 113 instructing the transmission of the aforementioned error-occurrence indication message, generator 115 provides the error-occurrence indication message and instructs transmitter-receiver 111 to transmit this message. Moreover, in accordance with the notification from anomaly determiner 113 instructing the transmission of the aforementioned message that notifies the other ECUs of the occurrence of the anomaly, generator 115 provides the message indicating the occurrence of the anomaly and instructs transmitter-receiver 111 to transmit this message. Furthermore, in accordance with the notification from anomaly determiner 113, generator 115 may generate the message indicating the instruction to be given to another ECU and instruct transmitter-receiver 111 to transmit this message.

Each of anomaly determiner 113, communicator 117, and generator 115 that execute the processing to handle the anomaly detected in the message indicating the speed information is an example of an anomaly processor according to the present embodiment.

[1.4. Structure of Anomaly-Possibility Determination Table]

FIG. 4 illustrates an example of the anomaly-possibility determination table according to the present embodiment. In the anomaly-possibility determination table of FIG. 4, horizontal rows indicate the traveling state of vehicle 1 based on the speed information, or more specifically, indicate the first traveling state. Vertical columns of this table indicate the traveling state of vehicle 1 based on the peripheral information, or more specifically, indicate the second traveling state.

When the first traveling state is the same as the second traveling state, this suggests that no message of speed information indicating a falsified speed of vehicle 1 is transmitted to in-vehicle network 700 by, for example, an unauthorized ECU. Based on this idea, an example is described as follows according to the present embodiment. When the first traveling state is "stopped state" and the second traveling state is also "stopped state", or more specifically, when the traveling states indicated by the two information items are the same, the level of anomaly possibility is at "level 0" indicating no anomaly. Similarly, suppose that (i) the first traveling state is "low-speed traveling state" and the second traveling state is also "low-speed traveling state", and (ii) the first traveling state is "high-speed traveling state" and the second traveling state is also "high-speed traveling state". In each of these cases, the traveling states indicated by the two information items are the same, and thus the level of anomaly possibility is at "level 0" indicating no anomaly.

For example, although the first traveling state and the second traveling state are different, this level of difference between these states may be caused even if no message of speed information indicating a falsified speed of vehicle 1 (hereinafter, such a message is also referred to as a false message) is transmitted. Here, such difference may be caused when a false message is transmitted to in-vehicle network 700. However, there is no possibility, or an extremely low possibility if any (a controllable level of possibility), that an operation of vehicle 1 may be affected by this difference. Suppose that (i) the first traveling state is "stopped state" and the second traveling state is "low-speed traveling state", (ii) the first traveling state is "low-speed traveling state" and the second traveling state is "stopped state" or "high-speed traveling state", and (iii) the first traveling state is "high-speed traveling state" and the second traveling state is "low-speed traveling state", in the example according to the present embodiment. In each of these cases, a difference between the traveling states indicated by the two information items is small as described above, and thus the level of anomaly possibility is at "level 1" indicating that the speed information is less likely to be anomalous.

For example, although the first traveling state and the second traveling state are different, this level of difference between these states may be less likely to be caused unless a false message is transmitted. Moreover, such difference may cause an anomaly to an operation of vehicle 1. Suppose that the first traveling state is "high-speed traveling state" and the second traveling state is "stopped state", in the example according to the present embodiment. In this case, the difference between these traveling states indicated by the two information items is as described above, and thus the level of anomaly possibility is at "level 2" indicating that the level of possibility of anomalous speed information is medium.

For example, although the first traveling state and the second traveling state are different, this level of difference between these states may be less likely to be caused unless a false message is transmitted. Moreover, such difference may cause vehicle 1 to perform an anomalous operation that can lead to an accident or may cause failure or significant wear and tear to vehicle 1. Suppose that the first traveling state is "stopped state" and the second traveling state is "high-speed traveling state", in the example according to the present embodiment. In this case, the difference between these traveling states indicated by the two information items is as described above, and thus the level of anomaly possibility is at "level 3" indicating that the level of possibility of anomalous speed information is high.

[1.5. Configuration of Other ECUs]

Next, configurations of the ECUs, aside from anomaly detection ECU 11 in FIG. 1, connected to in-vehicle network 700 are described in detail, with reference to a configuration of brake ECU 200 as an example. Note that each of engine ECU 100, in-vehicle camera ECU 300, steering ECU 400, GPS ECU 500 has basically the same configuration as brake ECU 200. Individual differences for each ECU are described later.

Figures 5, 6:
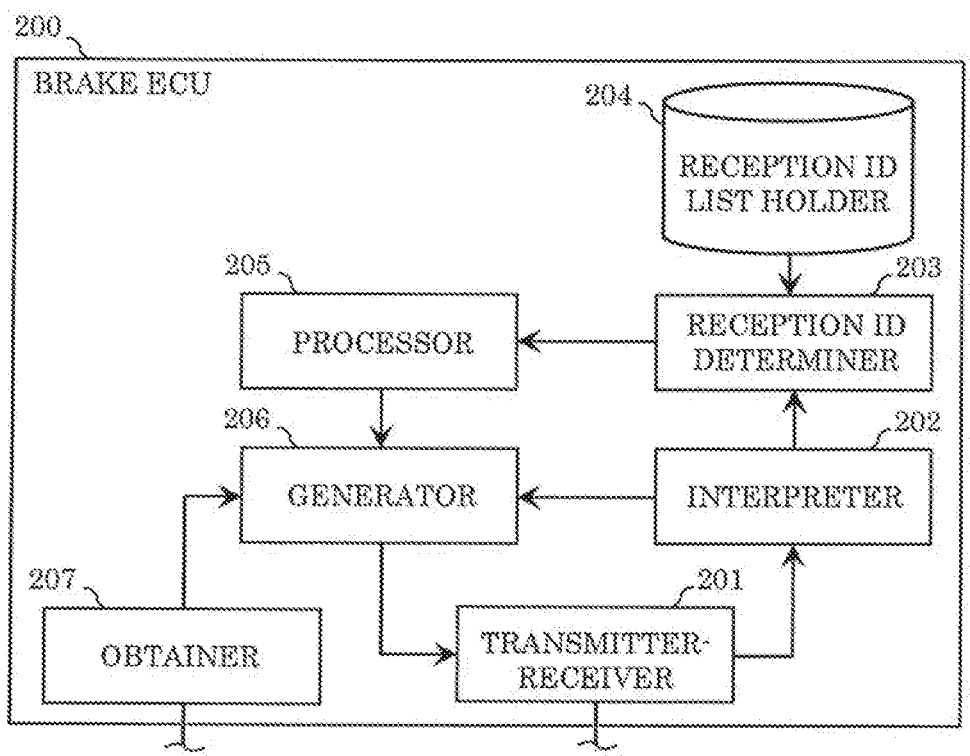
FIG. 5 illustrates a configuration of a brake ECU according to Embodiment.
FIG. 6 illustrates an example of a reception ID list according to Embodiment.

FIG. 5 illustrates a configuration of brake ECU 200. Brake ECU 200 includes transmitter-receiver 201, interpreter 202, reception ID determiner 203, reception ID list holder 204, processor 205, generator 206, and obtainer 207. Brake ECU 200 is implemented by, for example, a communication circuit, a memory, and a processor or a digital circuit that executes a control program (a computer program) stored in the memory. Each of the aforementioned components of brake ECU 200 is a functional component implemented by a processor executing one or more computer programs stored in the memory, for example.

Transmitter-receiver 201 transmits and receives frames based on the CAN protocol to and from in-vehicle network 700. More specifically, transmitter-receiver 201 receives a message one bit at a time from in-vehicle network 700 and then transfers the message to interpreter 202. Transmitter-receiver 201 also transmits, to in-vehicle network 700, a message notified by generator 206.

Interpreter 202 receives bit values included in the message from transmitter-receiver 201, and then interprets and maps the values into the fields in the aforementioned message format defined by the CAN protocol. Interpreter 202 transfers the value of the ID field of the message to reception ID determiner 203. On the basis of a result of determination notified by reception ID determiner 203, interpreter 202 determines whether to transfer the value of the ID field of the message and the data field present after the ID field to processor 205 or stop receiving this message after obtaining the result of determination from reception ID determiner 203, or more specifically, stop interpreting this message.

Reception ID determiner 203 receives the value of the ID field notified by interpreter 202, and determines whether to receive the fields that follow the ID field of the message on the basis of the ID list of messages to be received (the reception ID list). Reception ID determiner 203 notifies interpreter 202 of the result of this determination.

Reception ID list holder 204 holds the reception ID list including IDs of messages to be received by brake ECU 200. FIG. 6 illustrates an example of the reception ID list. As shown by an example of the reception ID list in FIG. 6, messages to be received by brake ECU 200 include a message indicating speed information (ID "1"), a message indicating image information (ID "3"), a message indicating contact time information (ID "1"), and a message indicating current location information (ID "5"), among messages to be transmitted from the ECUs described above. Note that the reception ID list held by reception ID list holder 204 may be different for each ECU. A structure of the reception ID list is described later.

In accordance with data of the received message, processor 205 performs processing related to a function different for each ECU. Brake ECU 200 is connected to the brake and obtains, from the brake, the brake information indicating an application level of the brake. Here, suppose that brake ECU 200 is also connected to, for example, a speaker (not shown) for sounding an alarm and thus has a function of sounding the alarm from this speaker when a door of vehicle 1 is opened while the brake is released. To implement this function, processor 205 of brake ECU 200 performs, for example, processing of sounding the alarm under a certain condition on the basis of information about an open-closed state of the door indicated by data received from another ECU and the application level of the brake indicated by the brake information obtained from the brake.

Another example of processing performed by processor 205 of brake ECU 200 is described. When receiving a diagnostic message instructing a specific operation of the brake, processor 205 causes the brake to execute this specific operation if a predetermined condition is satisfied. To be more specific, when receiving the message indicating the speed information, processor 205 holds the value of this speed information. When further receiving a diagnostic message instructing a specific operation of the brake, processor 205 performs control processing for the operation of the brake instructed by this diagnostic message if the value of the held speed information is 0 km/h. If the value of the held speed information is not 0 km/h, processor 205 does not perform the control processing for the operation of the brake instructed by this diagnostic message. When receiving a diagnostic message instructing a specific operation of the brake in addition to a message from anomaly detection ECU 11 notifying occurrence of an anomaly, processor 205 does not perform the control processing for the operation of the brake instructed by this diagnostic message regardless of the value of the held speed information.

An example of processing performed by processor 205 of another ECU is described. For example, processor 205 of engine ECU 100 may perform processing related to a function for sounding an alarm when the speed of vehicle 1 exceeds 30 km/h and a door of vehicle 1 is opened. Here, functions of the ECUs are not limited to those described as examples according to the present disclosure.

Obtainer 207 obtains data indicating, for example, a state from a device, such as a sensor, connected to brake ECU 200. Then, obtainer 207 notifies generator 206 of a value of the obtained data. For example, obtainer 207 obtains data indicating the application level of the brake as brake information, from the sensor included in the brake connected to brake ECU 200.

Generator 206 attaches a predetermined ID to the value of the data notified by obtainer 207 to generate a message based on the aforementioned message format. Then, generator 206 notifies transmitter-receiver 201 of this message. For example, when obtaining the aforementioned brake information from obtainer 207, generator 206 generates a message having the ID value "2" in the ID field and the value of the brake information in the data field and then notifies transmitter-receiver 201 of this message.

[1.6. Structure of Reception ID List]

FIG. 6 illustrates an example of the reception ID list held by brake ECU 200. The example of the reception ID list in FIG. 6 is used for selectively receiving and processing a frame including an ID value (a message ID) that is any one of "1", "3", "4", "5", and "6". For example, suppose that reception ID list holder 204 of brake ECU 200 holds the reception ID list illustrated in FIG. 6. For a frame having a value of the message ID that is not any one of "1", "3", "4", "5", and "6", interpreter 202 stops interpreting the fields present after the ID field of the message.

2. Anomaly Detection Processing

Figure 7:
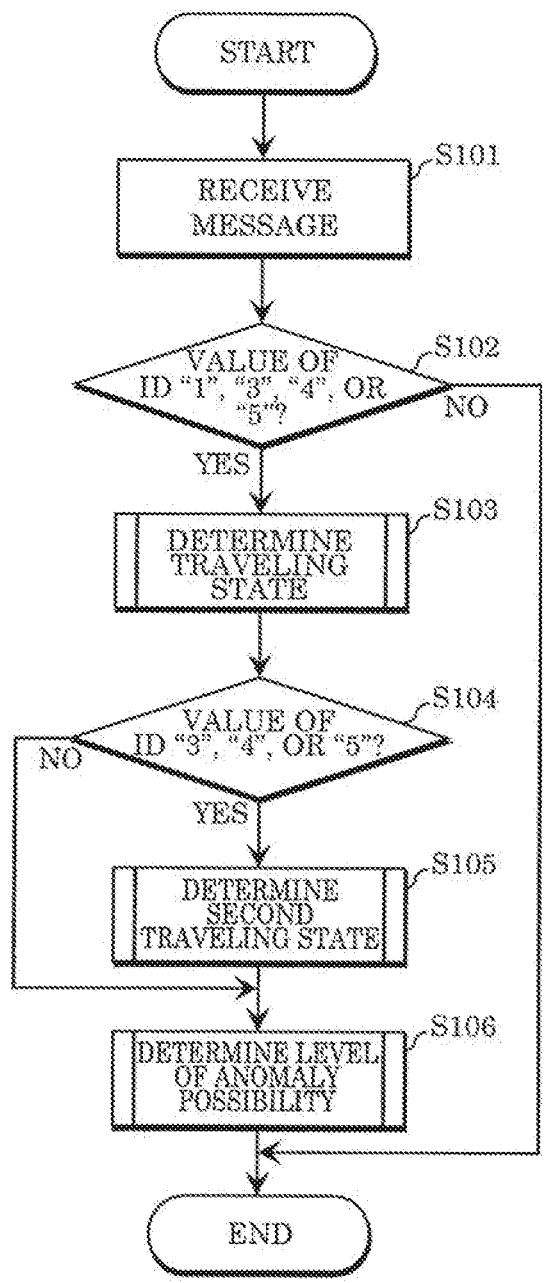
FIG. 7 illustrates an example of a flowchart of anomaly detection processing according to Embodiment.

FIG. 7 illustrates an example of a flowchart of anomaly detection processing performed by anomaly detection ECU 11 according to the present embodiment. For the processing described below, the aforementioned components of anomaly detection ECU 11 perform their functions.

(S101) Anomaly detection ECU 11 receives a message from in-vehicle network 700.

(S102) Anomaly detection ECU 11 determines whether the received message is to be used for the anomaly detection processing, from the ID value of the received message. To be more specific, anomaly detection ECU 11 determines whether the ID value of the message is any one of "1", "3", "4", and "5". If the ID value of the message is any one of "1", "3", "4", and "5" (Yes in this step), anomaly detection ECU 11 proceeds to Step S103. If the ID value of the message is not any one of "1", "3", "4", and "5" (No in this step), anomaly detection ECU 11 ends the anomaly detection processing.

(S103) Anomaly detection ECU 11 determines the traveling state of vehicle 1 using the value in the data field of the message. This determination processing is described in detail later. Note that the traveling state of vehicle 1 determined using the message having the ID value "1" is the first traveling state according to the present embodiment.

(S104) Anomaly detection ECU 11 determines, from the ID value of the received message, whether the type of the message is the peripheral information, or more specifically, whether the message is any one of the image information, the contact time information, and the current location information. To be more specific, anomaly detection ECU 11 determines whether the ID value of the message is any one of "3", "4", and "5". If the ID value of the message is any one of "3", "4", and "5" (Yes in this step), anomaly detection ECU 11 proceeds to Step S105. If the ID value of the message is not any one of "3", "4", and "5", or more specifically, if the ID value of the message is "1" indicating the speed information (No in this step), anomaly detection ECU 11 proceeds to Step S106.

(S105) Anomaly detection ECU 11 determines the traveling state of vehicle 1 using each type of the messages indicating the image information, the contact time information, and the current location information. Then, on the basis of the traveling states obtained as three results of determination, anomaly detection ECU 11 determines the traveling state of vehicle 1 indicated by the peripheral information (that is, determines the second traveling state). Details are described later.

(S106) Anomaly detection ECU 11 determines the level of anomaly possibility (the presence or absence of an anomaly) indicating that the received speed information is included in a false message, on the basis of the first traveling state and the second traveling state.

[2.1. Processing of Determining Traveling State of Vehicle]

Figure 8:
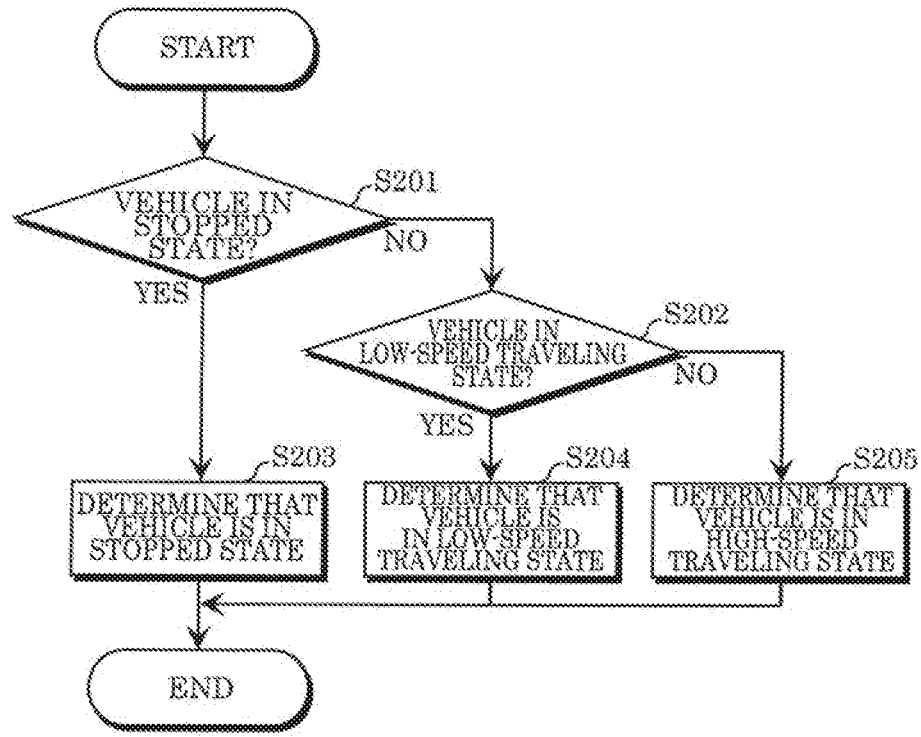
FIG. 8 illustrates an example of a flowchart of vehicle traveling-state determination processing according to Embodiment.

Next, the processing of determining the traveling state of vehicle 1 (Step S103 of FIG. 7) in the anomaly detection processing is described. FIG. 8 illustrates an example of a flowchart of the processing performed by anomaly detection ECU 11 to determine the traveling state of vehicle 1 according to the present embodiment.

(S201) Anomaly detection ECU 11 determines whether the traveling state of vehicle 1 is "stopped state", from the value in the data field of the received message. To be more specific, this determination is made as follows in accordance with the type of the received message.

When the received message indicates the speed information, anomaly detection ECU 11 determines whether the value in the data field is 0 km/h. If the value in the data field is 0 km/h (Yes in this step), anomaly detection ECU 11 proceeds to Step S203. If the value in the data field is not 0 km/h (No in this step), anomaly detection ECU 11 proceeds to Step S202.

When the received message indicates the image information, anomaly detection ECU 11 compares the value of feature amount in the data field with the value of feature amount obtained a predetermined period of time before. Anomaly detection ECU 11 calculates a degree of similarity between the two values of feature amount through this comparison, and determines whether the degree of similarity is higher than a predetermined value. If the calculated degree of similarity is higher than the predetermined value (Yes in this step), anomaly detection ECU 11 proceeds to Step S203. If the calculated degree of similarity is the predetermined value or lower (No in this step), anomaly detection ECU 11 proceeds to Step S202.

When the received message indicates the contact time information, anomaly detection ECU 11 compares the current time of day with the value in the data field denoting the latest time of day when the user of vehicle 1 contacts the steering wheel. Anomaly detection ECU 11 determines, through this comparison, whether more than a predetermined period time (a first period) has elapsed from the time of day denoted by the value in the data field to the current time of day. If the time of day denoted by the value in the data field precedes the first period (Yes in this step), anomaly detection ECU 11 proceeds to Step S203. If the time of day denoted by the value in the data field is within the first period (No in this step), anomaly detection ECU 11 proceeds to Step S202.

When the received message indicates the current location information, anomaly detection ECU 11 compares the value in the data field denoting the value of the current location information with a value of predetermined location information, such as a value of the current location information obtained last time or a value of the current location information obtained a predetermined period of time before. Anomaly detection ECU 11 determines, through this comparison, whether a change in location is within a predetermined range (a first range). If the change in location is within the first range (Yes in this step), anomaly detection ECU 11 proceeds to Step S203. If the change in location is not within the first range (No in this step), anomaly detection ECU 11 proceeds to Step S202.

(S202) Anomaly detection ECU 11 determines, from the value in the data field of the received message, whether the traveling state of the vehicle is the low-speed traveling state. To be more specific, this determination is made as follows in accordance with the type of the received message.

When the received message indicates the speed information, anomaly detection ECU 11 determines whether the value in the data field is more than 0 km/h but not more than a predetermined value. If the value in the data field is more than 0 km/h but not more than the predetermined value (Yes in this step), anomaly detection ECU 11 proceeds to Step S204. If the value in the data field is not more than 0 km/h nor not more than the predetermined value, or more specifically, the value in the data field exceeds the predetermined value (No in this step), anomaly detection ECU 11 proceeds to Step S205.

When the received message indicates the image information, anomaly detection ECU 11 determines whether the degree of similarity calculated in Step S201 is within a predetermined range higher than the predetermined value used in Step S201. If the calculated degree of similarity is within the predetermined range (Yes in this step), anomaly detection ECU 11 proceeds to Step S204. If the calculated degree of similarity is not within the predetermined range (No in this step), anomaly detection ECU 11 proceeds to Step S205.

When the received message indicates the contact time information, anomaly detection ECU 11 determines whether the time of day denoted by the value in the data field is within the first period in Step S201 and also precedes a predetermined period of time (a second period) counted from the current time of day. Here, the second period is shorter than the first period. If the time of day denoted by the value in the data field is within the first period and precedes the second period (Yes in this step), anomaly detection ECU 11 proceeds to Step S204. If the time of day denoted by the value in the data field is within the second period (No in this step), anomaly detection ECU 11 proceeds to Step S205.

When the received message indicates the current location information, anomaly detection ECU 11 determines whether the change in location obtained through the comparison in Step S201 is within a predetermined range (a second range) larger than the first range. If the change in location is within the second range (Yes in this step), anomaly detection ECU 11 proceeds to Step S204. If the change in location is not within the second range (No in this step), anomaly detection ECU 11 proceeds to Step S205.

(S203) Anomaly detection ECU 11 determines that the traveling state of vehicle 1 indicated by the received message is the stopped state. If the received message indicates the image information, such determination is likely to be made when, for example, a view in front of vehicle 1 in the traveling direction does not change or hardly changes, that is, when vehicle 1 is not or hardly moving. Moreover, if the received message indicates the contact time information, such determination is likely to be made when, for example, the steering wheel has not been moved for a predetermined period of time long enough, which is less likely if vehicle 1 is traveling on an ordinary road. Furthermore, if the received message indicates the current location information, such determination is likely to be made when the location of vehicle 1 does not change or hardly changes from the location obtained last time.

(S204) Anomaly detection ECU 11 determines that the traveling state of vehicle 1 indicated by the received message is the low-speed traveling state. If the received message indicates the image information, such determination is likely to be made when, for example, a distance traveled by vehicle 1 during a predetermined period of time is so short that a view in front of vehicle 1 in the traveling direction hardly changes. Moreover, if the received message indicates the contact time information, such determination is likely to be made when, for example, a brief period of time has elapsed since the latest operation performed on the steering wheel by the user of vehicle 1 for driving. Furthermore, if the received message indicates the current location information, such determination is likely to be made when the location of vehicle 1 changes, but not so significantly, since the last time the location information was obtained.

(S205) Anomaly detection ECU 11 determines that the traveling state of vehicle 1 indicated by the received message is the high-speed traveling state. If the received message indicates the image information, such determination is likely to be made when, for example, a distance traveled by vehicle 1 during the predetermined period of time is so long that a view in front of vehicle 1 in the traveling direction completely changes. Moreover, if the received message indicates the contact time information, such determination is likely to be made when, for example, this message is received immediately after the latest operation performed on the steering wheel by the user of vehicle 1 for driving. Furthermore, if the received message indicates the current location information, such determination is likely to be made when the location of vehicle 1 changes significantly since the last time the location information was obtained.

[2.2. Processing of Determining Traveling State of Vehicle Using Peripheral Information]

Figure 9:
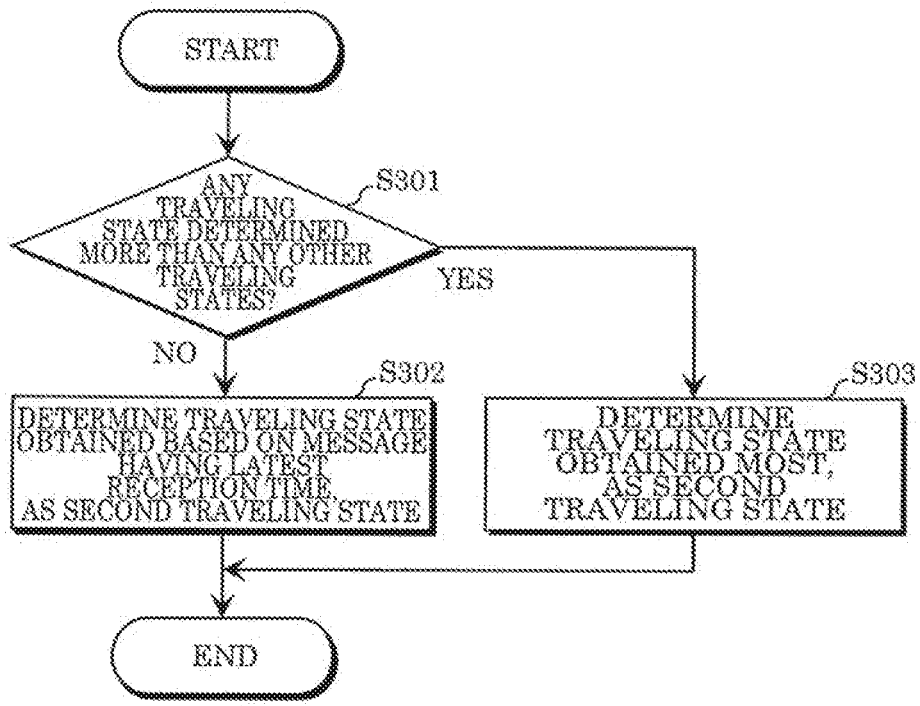
FIG. 9 illustrates an example of a flowchart of vehicle traveling-state determination processing performed using peripheral information, according to Embodiment.

Next, the processing of determining the traveling state of the vehicle on the basis of the peripheral information, or more specifically, the processing of determining the second traveling state (Step S105 in FIG. 7) is described. Anomaly detection ECU 11 determines the second traveling state of vehicle 1 on the basis of the three results of determining the traveling state of vehicle 1 by using the peripheral information in Step S103 in the anomaly detection processing. More specifically, the peripheral information is classified according to the message types, that is, the image information, the contact time information, and the current location information. FIG. 9 illustrates an example of a flowchart of the processing performed by anomaly detection ECU 11 to determine the second traveling state of vehicle 1 according to the present embodiment.

(S301) Anomaly detection ECU 11 determines whether the three results of the determination of the traveling state using the image information, the contact time information, and the current location information include any traveling state that is determined more than any other traveling states. To be more specific, if at least two results of the determination indicate the same traveling state (Yes in this step), anomaly detection ECU 11 proceeds to Step S303. If no traveling state is determined twice or more, or more specifically, the three results of determination are all different (No in this step), anomaly detection ECU 11 proceeds to Step S302.

(S302) Anomaly detection ECU 11 determines, as the second traveling state, the traveling state obtained as the result of the determination using the message having the latest reception time.

(S303) Anomaly detection ECU 11 determines, as the second traveling state, the traveling state indicated by at least two among the three results of the determination.

[2.3. Processing of Determining Anomaly Possibility]

Figure 10:
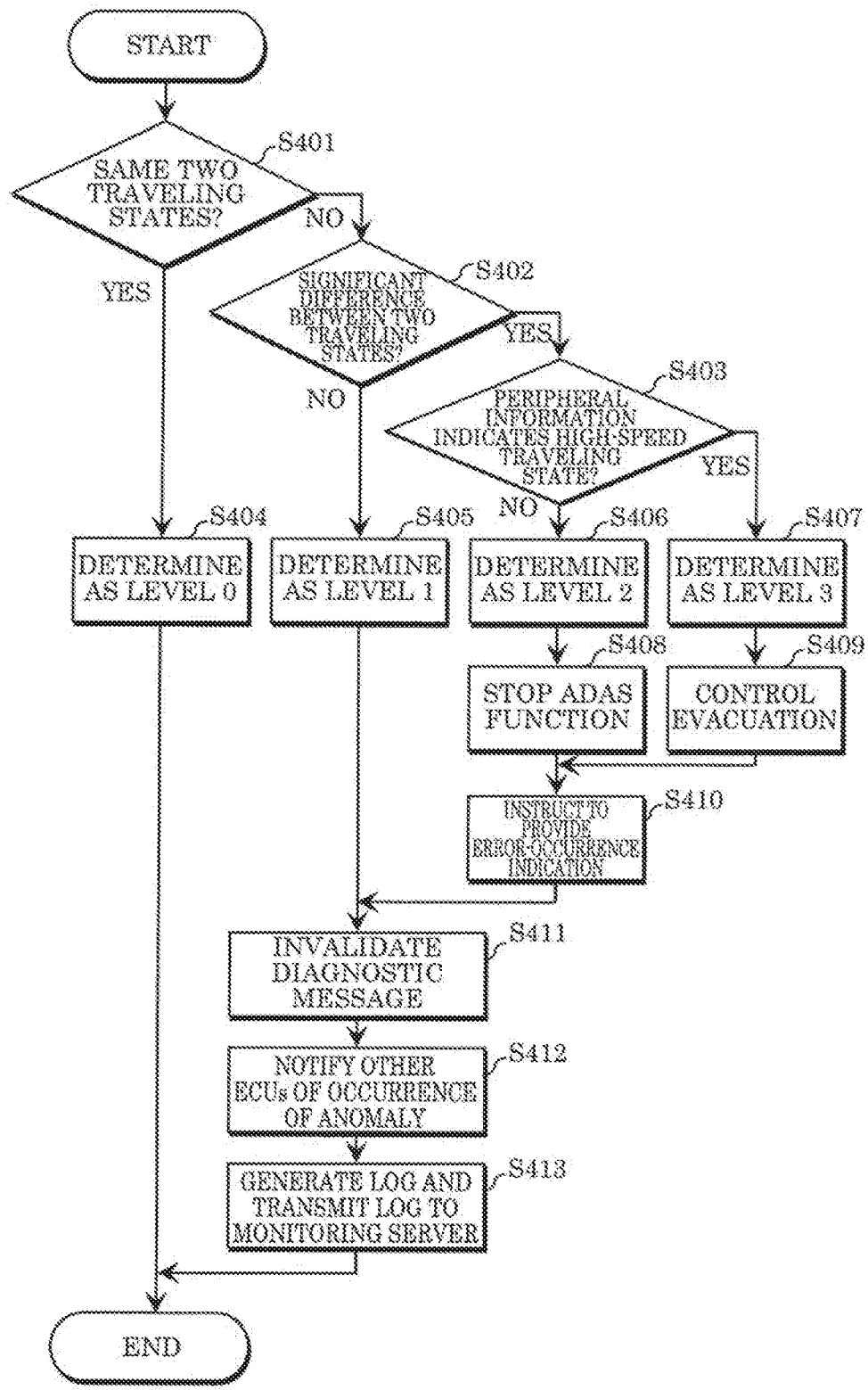
FIG. 10 illustrates an example of a flowchart of anomaly-possibility determination processing according to Embodiment.

Next, the processing of determining an anomaly possibility (the presence or absence of an anomaly) (Step S106 in FIG. 7) is described in detail. In this anomaly-possibility determination processing, anomaly detection ECU 11 uses the first traveling state and the second traveling state of vehicle 1 to determine a level of anomaly possibility that the received message indicating the traveling information is anomalous. The anomaly-possibility determination processing according to the present embodiment includes handling appropriate to the determined level of anomaly possibility. FIG. 10 illustrates an example of a flowchart of the anomaly-possibility determination processing performed by anomaly detection ECU 11 according to the present embodiment.

(S401) Anomaly detection ECU 11 determines whether the first and second traveling states of vehicle 1 are the same. If so (Yes in this step), anomaly detection ECU 11 proceeds to Step S404. If not (No in this step), anomaly detection ECU 11 proceeds to Step S402.

(S402) Anomaly detection ECU 11 determines whether a difference between the first traveling state and the second traveling state of vehicle 1 is significant. Here, the difference between the first traveling state and the second traveling state is represented by a difference between two out of the traveling states expressed by the three stages. For example, suppose that the traveling state of vehicle 1 indicated by the speed information is "stopped state" and that the traveling state of vehicle 1 indicated by the peripheral information is "high-speed traveling state". In this case, anomaly detection ECU 11 determines that the difference between the first traveling state and the second traveling state is significant. Suppose that the traveling state of vehicle 1 indicated by the speed information is "stopped state" and that the traveling state of vehicle 1 indicated by the peripheral information is "low-speed traveling state". In this case, anomaly detection ECU 11 determines that the difference between the first traveling state and the second traveling state is not significant. More specifically, if the difference between the traveling state of vehicle 1 indicated by the speed information and the traveling state of vehicle 1 indicated by the peripheral information in this example corresponds to a two-stage difference among the three stages, the difference between these traveling states is determined to be significant. For no difference or a one-stage difference, the difference between the traveling states is determined to be not significant. If the difference is significant (Yes in this step), anomaly detection ECU 11 proceeds to Step S403. If the difference between the traveling states is not significant (No in this step), anomaly detection ECU 11 proceeds to Step S405.

(S403) Anomaly detection ECU 11 determines whether the second traveling state of vehicle 1 is "high-speed traveling state". If the second traveling state is "high-speed traveling state" (Yes in this step), anomaly detection ECU 11 proceeds to Step S407. If the second traveling state is not "high-speed traveling state" (No in this step), anomaly detection ECU 11 proceeds to Step S406.

(S404) Anomaly detection ECU 11 determines that no anomaly is present (level 0). The anomaly detection processing by anomaly detection ECU 11 ends here.

(S405) Anomaly detection ECU 11 determines that the level of possibility that the message indicating the traveling information is anomalous is low (level 1).

(S406) Anomaly detection ECU 11 determines that the level of possibility that the message indicating the traveling information is anomalous is medium (level 2).

(S407) Anomaly detection ECU 11 determines that the level of possibility that the message indicating the traveling information is anomalous is high (level 3).

Anomaly detection ECU 11 may execute Steps S401 to S407 described above, with reference to the anomaly-possibility determination table in FIG. 4.

The processing described below is performed to handle the anomaly, in accordance with the determined level of anomaly possibility.

(S408) Anomaly detection ECU 11 transmits, to in-vehicle network 700, a message of an instruction to stop an advanced driver assistance system (ADAS) function of vehicle 1. This handling is an example of the processing performed for the medium level of anomaly possibility.

(S409) Anomaly detection ECU 11 transmits, to in-vehicle network 700, a message of an instruction to evacuate vehicle 1 to a road shoulder, for example, using an automated driving function. This handling is an example of the processing performed for the high level of anomaly possibility.

(S410) Anomaly detection ECU 11 transmits, to in-vehicle network 700, an error-occurrence indication message to cause, for example, the head unit of vehicle 1 to provide the user of vehicle 1 with a predetermined error-occurrence indication related to the anomaly. This handling is an example of the processing performed for the medium or high level of anomaly possibility.

(S411) Anomaly detection ECU 11 invalidates the diagnostic message transmitted over in-vehicle network 700. For example, anomaly detection ECU 11 invalidates this diagnostic message by transmitting an error frame to interrupt the transmission of the diagnostic message over the in-vehicle network 700. This inhibits vehicle 1 from operating according to a false diagnostic message that includes an operational instruction to be given to an in-vehicle device.

(S412) Anomaly detection ECU 11 transmits, to in-vehicle network 700, a message to notify all the ECUs connected to in-vehicle network 700 of the occurrence of the anomaly.

(S413) Anomaly detection ECU 11 generates a log using information related to a plurality of messages received and used for the determination, such as the contents and reception times of the received messages, and transmits the generated log to monitoring server 900.

3. Advantageous Effect of Embodiment

In-vehicle network system 10 according to the present embodiment determines whether the traveling state of vehicle 1 (the first traveling state) determined using the message indicating the speed information transmitted from an ECU connected to in-vehicle network 700 is the same as the traveling state of vehicle 1 (the second traveling state) determined using the message indicating the peripheral information transmitted from another ECU also connected in-vehicle network 700. If these traveling states are not the same, the level of anomaly possibility of the message indicating the speed information is determined on the basis of the level of difference between the traveling states. Then, the processing appropriate to the level of anomaly possibility is performed.

For example, suppose that an attacker transmits a message indicating a falsified speed information to in-vehicle network 700 and then also transmits a diagnostic message from external device 800, which is the diagnostic tool, via external communication device 600. Even in this case, an anomaly of this message indicating the speed information is detected.

The second traveling state may be determined using the results of determining the traveling state on the basis of a plurality of types of peripheral information. For three types of peripheral information, for example, if two out of the three results of determination made based on each of these three peripheral information items indicate the same traveling state, this traveling state is determined as the second traveling state. This enhances the accuracy of the traveling state determined based on the peripheral information that may also be affected by any change other than change in the speed of vehicle 1. For example, the image information may change between immediately before and immediately after vehicle 1 makes a turn at an intersection, as significantly as in the high-speed traveling state. However, the contact time information and the current location information may indicate a change depending on the speed of vehicle 1 regardless of whether immediately before or immediately after vehicle 1 makes a turn at an intersection. Thus, also in such a case, the second traveling state is highly likely to be determined by accurately reflecting the speed of vehicle 1.

The processing executed to handle the anomaly of the message indicating the speed information maintains vehicle 1 more secure. The processing to handle an anomaly depends on the level of anomaly possibility. For example, the processing is executed to a sufficient degree for a higher determined level of anomaly possibility. This is because it is important, in terms of danger, to reduce an effect of an attack, among any possible attacks, that is carried out while the vehicle is traveling, especially at a high speed. For a lower level of anomaly possibility, the processing is performed without compromising convenience for the user of vehicle 1. For example, as in the processing illustrated by the flowchart in FIG. 10, an attack using the falsified diagnostic message is stopped by invalidating the diagnostic message regardless of the level of anomaly possibility unless no anomaly is detected. Moreover, the other ECUs connected to in-vehicle network 700 are notified about the occurrence of the anomaly, and the log is transmitted to monitoring server 900. This gives the alarm for the attack and prevents the anomaly from spreading. For a higher level of anomaly possibility, an advanced function, such as ADAS, is stopped. This reduces a possibility that a false message transmitted through the attack affects traveling of vehicle 1. When vehicle 1 is traveling at a high speed, vehicle 1 is immediately moved to a safe place and the traveling function of vehicle 1 is stopped (evacuated). This prevents vehicle 1 from causing an accident and thus maintains safety. When any function associated with a driving operation of vehicle is intervened for security, such as when ADAS is stopped or vehicle 1 is evacuated, the user is notified about this intervention.

OTHER EMBODIMENTS

Although the technology according to the present disclosure has been described by way of the embodiment above, it should be obvious that the technology according to the present disclosure is not limited to the embodiment described above. Other embodiments implemented through various changes, substitutions, additions, and omissions may be included in the scope in an aspect or aspects according to the present disclosure. For example, the following variations are also included in an aspect or aspects according to the present disclosure.

(1) In the embodiment above, the aforementioned anomaly detection function of in-vehicle network system 10 is provided by a dedicated anomaly detection ECU separate from the other ECUs. However, this is not intended to be limiting.

The anomaly detection function may be implemented by any ECU connected to in-vehicle network 700 instead of an ECU dedicated to anomaly detection. The ECU implementing this function may also have another function different from the anomaly detection function. For example, the aforementioned configuration of anomaly detection ECU 11 may be included in an ECU, such as brake ECU 200, having another function.

Moreover, a part of the function of anomaly detection ECU 11 may be a function of another ECU. For example, some or all of the aforementioned components in anomaly detection ECU 11 may be incorporated separately into a plurality of ECUs having different functions. In this case, these ECUs achieve the aforementioned function of anomaly detection ECU 11 by communicating data in cooperation with each other via in-vehicle network 700 or a dedicated line.

Furthermore, the anomaly detection function of anomaly detection ECU 11 may be implemented by any other ECU. For example, an ECU that receives a message and controls the vehicle in response to the message may have an anomaly detection function similar to that of anomaly detection ECU 11.

In the embodiment above, the peripheral information of each type is indicated by an individual message. However, this is not intended to be limiting. For example, the ECU performing the function of interpreter 114 may combine different types of the peripheral information into one message and transmit this message to the ECU performing the function of traveling-state determiner 112. Moreover, the information items used as the peripheral information may include more types in addition to the aforementioned types, which are described later. At least two out of these types may be transmitted from a single ECU to the anomaly detection ECU.

For example, suppose that the in-vehicle network system includes a plurality of in-vehicle networks and a gateway ECU that transfers messages among the plurality of in-vehicle networks. In this case, this gateway ECU may have an anomaly detection function. The gateway ECU monitors states of the in-vehicle networks and thus is useful.

If determining that the received message may be anomalous, the gateway ECU having such a configuration does not transfer the received diagnostic message. This processing is also included in the invalidation of the diagnostic message, in an aspect according to the present disclosure.

The ECU performing the function of external communication device 600 may have an anomaly detection function.

A key management master ECU that manages a private key may have the aforementioned anomaly detection function of anomaly detection ECU 11.

(2) In the embodiment above, anomaly detection ECU 11 determines the second traveling state of vehicle 1 using the peripheral information, such as the degree of similarity based on the image information, the contact time of day when the user of vehicle 1 contacts the steering wheel, and the coordinates of the current location of vehicle 1 (the latitude and longitude of the location). However, these information items are merely examples of the peripheral information.

The peripheral information may further include, in addition to the aforementioned items, detection times and sensor values of various sensors provided for the vehicle. For example, a time of day when contact is made with an accelerator pedal or a car seat may be used as the peripheral information. Here, this contact time of day is not limited to a time of day when contact is made, and may be a time of day when contact is no longer detected. Moreover, the following may be used as the peripheral information, for example: a speed of wheel rotation; a yaw rate; an acceleration rate; a steering angle; an accelerator position or an amount of pressure on the accelerator pedal; a braking level; an engine speed; a motor speed; a state of an ignition switch; steering torque of the steering wheel; the presence or absence of an obstacle ahead of the vehicle; the presence or absence of an obstacle behind the vehicle; a distance from an obstacle ahead of the vehicle; a distance from an obstacle behind the vehicle; a state of recognizing road marking lines on the right and left sides of the vehicle; and distances from the road marking lines on the right and left sides of the vehicle.

In the embodiment above, anomaly detection ECU 11 determines the second traveling state using the three types of message. However, this is merely an example. The number of messages to be used may be one, two, or four or more. Moreover, any combination of the messages described above may be used.

The traveling state to be determined as the second traveling state is conditional on being determined most among the traveling states obtained as the results of the determination made using the respective messages. However, this is not intended to be limiting. For example, a lower limit may be provided. When seven types of message are used, for example, the traveling state to be determines as the second traveling state is conditional on being determined most and obtained as results of the determination made based on at least three out of the seven types of message. Alternatively, the traveling state to be determined as the second traveling state may be conditional on being determined by a majority.

For example, if at least two traveling states are determined most and that the numbers of these most-determined traveling states are the same, the traveling state determined using a newer message may be determined as the traveling state of the vehicle indicated by the peripheral information. For example, suppose that five types of message are used and that two determination results indicate the stopped state and two determination results indicate the low-speed traveling state. In this case, either the stopped state or the low-speed traveling state that is obtained as a result of determination using a newer message is determined as the traveling state of the vehicle indicated by the peripheral information. This manner of determination may also be applied if all the traveling states obtained as results of the determination are different.

(3) In the embodiment above, timing of obtaining the first communication message or the second communication message used for determining the traveling state of the vehicle is not limited. However, this timing may be limiting. A plurality of traveling states used for determining the second traveling state may be limited to those determined using a plurality of types of the second communication messages obtained during a predetermined duration of time. Moreover, comparison may be made between the first traveling state and the second traveling state determined using the first communication message and the second communication message obtained during a predetermined duration of time, for example. The use of the traveling state of the vehicle determined based on the information obtained most recently enhances the accuracy of the determination. Alternatively, a criterion of determining that the first and speed traveling states are the same may be changed in accordance with a temporal difference between the first communication message and the second communication message used for determining the first traveling state and the second traveling state. For example, for a smaller temporal difference, the traveling state may be expressed using more stages. This reduces tolerance for speed difference between the first traveling state and the second traveling state that may be determined as the same stage.

(4) The methods of determining the traveling state of the vehicle using the peripheral information of various types according to the embodiment above are merely examples. The traveling state of the vehicle may be determined based on the peripheral information by other methods. Examples of the other methods are described. For image information received as the peripheral information, the traveling state of the vehicle may be determined using an optical flow obtained by processing this image information. For contact time information, the traveling state of the vehicle may be determined using the contact time information and a time counted by a timer included in the ECU or determined statistically using a plurality of contact time information items that have been obtained thus far and time intervals between the times when these information items were obtained. For current location information of the vehicle, the traveling state of the vehicle may be determined statistically using a plurality of current location information items that have been obtained thus far and time intervals between the times when these information items were obtained.

(5) In the embodiment above, the three stages are used to express the traveling state of the vehicle, which are the stopped state, the low-speed traveling state, and the high-speed traveling state. However, this is merely an example. To express the traveling state of the vehicle, at least a stopped state and a non-stopped state may be used. In this case, if the first traveling state and the second traveling state are the same, it is determined that no anomaly is present. If not, it is determined that an anomaly is present or possibly present. The non-stopped state may be further divided into multiple stages. Alternatively, the traveling state may be determined based on speed values, like the stages described above, estimated from the information indicated by the messages. In this case, a speed value indicated by the speed information may be used as the first traveling state. A speed value used as the second traveling state may be obtained statistically from speed values estimated from the peripheral information of various types. For example, an average of speed values within a predetermined difference range, among the estimated speed values, may be used as the second traveling state. If a difference between the estimated speed values or a temporal difference between reception times of the traveling information based on which the speed values are estimated is greater than a predetermined criterion, the speed value estimated from latest traveling information may be used as the second traveling state. The presence, absence, or possibility of an anomaly in the speed information may be determined based on a level of difference between the speed value of the first traveling state and the speed value of the second traveling state. In this case, if the difference between these two speed values is within a predetermined difference range, the traveling state based on the speed information is determined to be the same as the traveling state based on the peripheral information. If the traveling state based on the speed information is determined to be different from the traveling state based on the peripheral information, the level of anomaly possibility is determined based on a level of difference between the two speed values.

(6) Depending on a method of attack, the anomaly detection ECU may be incapable of receiving the first communication message or the second communication message. For example, transmission of numerous packets to the CAN bus may cause a delay disabling the reception on the receiving side or may cause the message itself to be lost. As another example, injection of a specific diagnostic command into the CAN bus allows a target ECU to stop the transmission of packets over a predetermined period of time. In such a case, the level of anomaly possibility may be determined to be higher than when the traveling state is determined using both of the received messages. For example, suppose that the traveling state based on the speed information indicated by the first communication message, or more specifically, the first traveling state, is the low-speed traveling state. In this case, the anomaly possibility is at level 0 or 1 according to the anomaly-possibility table of FIG. 4. However, if incapable of receiving the second communication message, the anomaly detection ECU may determine that the anomaly possibility is at level 2. As another example, suppose that although the first traveling state has been determined using the obtained first communication message, the anomaly detection ECU has been incapable of obtaining the second communication message for more than a predetermined period of time. In this case, a higher level of anomaly possibility than the level to be determined based on the anomaly-possibility table of FIG. 4 may be determined, and more advanced processing than the processing described above may be executed to handle the anomaly.

(7) The embodiment above describes an example for an ID based on a standard format. However, an ID may be based on an extended format.

(8) The embodiment above describes an example in which a message is transmitted in plain text. However, the message may be encrypted. Moreover, the message may include a message authentication code.

(9) In the embodiment above, the in-vehicle network is described as an example of a network communication system achieving communications based on the CAN protocol. However, application of the technology according to the present disclosure is not limited to the use in in-vehicle networks. The technology according to the present disclosure may be applied to networks of, for example, robots or industrial equipment, and also applied to network communication systems, aside from in-vehicle networks, achieving communications based on the CAN protocol.

The CAN protocol is used above as an in-vehicle network. However, this is not intended to be limiting. For example, CAN with flexible data rate (CAN-FD), FlexRay, Ethernet, local interconnect network (LIN), or media oriented systems transport (MOST) may be used. Alternatively, a network combining these networks as subnetworks may be used.

(10) The embodiment above describes the security measures for the in-vehicle network mounted on the vehicle that is an automobile. The range of application is not limited to this. The vehicle is not limited to an automobile, and the technology may be applied to means of mobility, such as construction equipment, farm equipment, ships, trains, and airplanes. More specifically, the technology is applicable as the security measures for mobility networks and mobility network systems.

(11) More specifically, each of the devices in the embodiment above may be a computer system configured with, for example, a microprocessor, a ROM, a RAM, a hard disk unit, a display unit, a keyboard, and a mouse. The RAM or the hard disk unit stores a computer program. The microprocessor operates according to the computer program, so that each function of the devices is achieved. Here, the computer program includes a plurality of instruction codes indicating instructions to be given to the computer so as to achieve a specific function.

(12) Some or all of the structural components included in each of the devices in the embodiment above may be realized as a single system large scale integration (LSI). The system LSI is a super multifunctional LSI manufactured by integrating a plurality of structural components onto a signal chip. To be more specific, the system LSI is a computer system configured with a microprocessor, a ROM, and a RAM, for example. The RAM stores a computer program. The microprocessor operates according to the computer program, so that a function of the system LSI is achieved.

Furthermore, the structural components in each of the above-described devices may be implemented by individual chips. Alternatively, some or all of the components may be implemented by a single chip.

Although the integrated circuit implementing these structural components is referred to as the system LSI here, the integrated circuit may be referred to as an IC, an LSI, a super LSI, or an ultra LSI depending on the scale of integration. Moreover, a method of implementation of the structural components using an integrated circuit is not limited to application of an LSI. The components may be implemented by a dedicated circuit or a general-purpose processor. It is also possible to use a field programmable gate array (FPGA) that can be programmed after being manufactured, or a reconfigurable processor in which connection and setting of circuit cells in an LSI can be reconfigured.

Furthermore, when a circuit integration technology that replaces LSIs comes along owing to advances of the semiconductor technology or to a separate derivative technology, the function blocks should be understandably integrated using that technology. There can be a possibility of adaptation of biotechnology, for example.

(13) Some or all of the components included in each of the devices described above may be implemented as an IC card or a standalone module that can be inserted into and removed from the corresponding device. The IC card or the module is a computer system configured with a microprocessor, a ROM, and a RAM, for example. The IC card or the module may include the aforementioned super multifunctional LSI. The microprocessor operates according to the computer program, so that a function of the IC card or the module is achieved. The IC card or the module may be tamper-resistant.

(14) The present disclosure may be the method including the respective steps of the process illustrated in FIG. 7. Furthermore, the present disclosure may be a computer program which causes a computer to implement the method. Moreover, the present disclosure may be a digital signal of the computer program.

Moreover, the present disclosure may be the aforementioned computer program or digital signal recorded on a computer-readable recording medium, such as a flexible disk, a hard disk, a CD-ROM, an MO, a DVD, a DVD-ROM, a DVD-RAM, a Blu-ray (registered trademark) disc (BD), or a semiconductor memory. The present disclosure may also be the digital signal recorded on such a recording medium.

Furthermore, the present disclosure may be the aforementioned computer program or digital signal transmitted via a telecommunication line, a wireless or wired communication line, a network represented by the Internet, and data broadcasting.

Moreover, the present disclosure may be a computer system including a microprocessor and a memory. The memory may store the aforementioned computer program and the microprocessor may operate according to the computer program.

The present disclosure may be achieved by an in-vehicle network system connected to a plurality of ECUs, each of which is connected to an in-vehicle network and includes a processor and a memory. The plurality of ECUs include the anomaly detection ECU, the external communication device, and the ECUs connected to the in-vehicle devices, such as the engine ECU and the brake ECU, described above. In addition, the plurality of ECUs may include an unauthorized ECU unknown to a manufacturer or the user of the vehicle. These ECUs include a first ECU that transmits, to the in-vehicle network, the first communication message indicating the speed information of the vehicle. Moreover, the ECUs include a second ECU that transmits, to the in-vehicle network, the second communication message indicating the peripheral information. Furthermore, the ECUs include a third ECU that receives an external message transmitted to the in-vehicle network from the external device, such as the diagnostic tool, via the external communication device and then executes the processing appropriate to the external message in accordance with the value of the first communication message. The processing appropriate to the external message is, for example, execution of an instruction included in the external message to control the in-vehicle device. This control instruction is executed by the third ECU if the first traveling state of the vehicle determined based on the value of the first communication message is the stopped state. However, if the second traveling state of the vehicle determined based on the peripheral information is different from the first traveling state, this control instruction is not executed by the third ECU even if the first traveling state is the stopped state. This is achieved by the anomaly detection ECU, which determines that the first traveling state and the second traveling state are different, or more specifically, that the first communication message may have an anomaly, and thus invalidates the external message as an example of the processing to handle the anomaly.

Furthermore, by transferring the recording medium having the aforementioned computer program or digital signal recorded thereon or by transferring the aforementioned computer program or digital signal via the aforementioned network or the like, the present disclosure may be implemented by a different independent computer system.

INDUSTRIAL APPLICABILITY

The present invention is usable for an in-vehicle network system including an in-vehicle network.

What is claimed is:

1. An anomaly detection electronic control unit connected to an in-vehicle network used by a plurality of electronic control units for communication, the anomaly detection electronic control unit comprising:
    a communicator that receives a first communication message indicating speed information of a vehicle including the in-vehicle network and a second communication message indicating peripheral information of the vehicle;
    a processor; and
    a memory including at least one set of instructions that, when executed by the processor causes the processor to perform operations including:
    (A) determining a first traveling state of the vehicle based on the speed information and a second traveling state of the vehicle based on the peripheral information;
    (B) determining, by comparing the first traveling state with the second traveling state, that the first communication message is anomalous when the first traveling state is different from the second traveling state and that the first communication message is normal when the first traveling state is same as the second traveling state; and
    (C) executing processing to handle an anomaly when the first communication message is determined to be anomalous in operation (B).

2. The anomaly detection electronic control unit according to claim 1,
    wherein the first traveling state and the second travelling state are expressed using one of at least three stages, which are a high-speed traveling state, a low-speed traveling state, and a stopped state, in operation (B), a level of anomaly possibility of the first communication message is determined based on a level of difference between the one of the at least three stages that indicates the first traveling state and the one of the at least three stages that indicates the second traveling state, and the processing is different depending on the level of anomaly possibility.

3. The anomaly detection electronic control unit according to claim 2, wherein in operation (B), when the first traveling state is different from the second traveling state, and the second traveling state is currently the high-speed traveling state, the level of anomaly possibility of the first communication message is determined to be higher than when the second traveling state is currently the low-speed traveling state.

4. The anomaly detection electronic control unit according to claim 2, wherein the second communication message indicates at least three types of peripheral information, and in operation (A), when traveling states obtained as results of determination made based on each of the at least three types of the peripheral information include different traveling states, a traveling state that is determined most among the traveling states determined based on each of the at least three types of the peripheral information is determined as the second traveling state.

5. The anomaly detection electronic control unit according to claim 4, wherein in operation (A), when at least two traveling states are determined most among the traveling states obtained as the results of determination made based on each of the at least three types of the peripheral information and total numbers of the at least two traveling states determined most are same, the traveling state determined using the second communication message that is newest, from among the at least two most-determined traveling states, is determined as the second traveling state.

6. The anomaly detection electronic control unit according to claim 1, wherein the second communication message includes image information of an image captured by an in-vehicle camera included in the vehicle, and in operation (A) the traveling state of the vehicle is determined using the image information.

7. The anomaly detection electronic control unit according to claim 1, wherein the second communication message includes contact time information indicating a time of day when a user of the vehicle contacts at least one of a steering wheel, an accelerator pedal, or a car seat, and in operation (A), the traveling state of the vehicle is determined using the contact time information.

8. The anomaly detection electronic control unit according to claim 1, wherein the second communication message includes current location information indicating a current location of the vehicle, and in operation (A) the traveling state of the vehicle is determined using the current location information.

9. The anomaly detection electronic control unit according to claim 1, wherein the processing includes notifying a user of the vehicle about an occurrence of the anomaly.

10. The anomaly detection electronic control unit according to claim 1, wherein the processing includes instructing an intervention in a driving operation of the vehicle.

11. The anomaly detection electronic control unit according to claim 1, wherein the in-vehicle network is further connected to an external communication device that communicates with an external network, the communicator receives an external message received by the external communication device from the external network, and the anomaly processor further invalidates the external message when the first communication message is determined to be anomalous.

12. The anomaly detection electronic control unit according to claim 1, wherein the in-vehicle network is further connected to an external communication device that communicates with an external network, the external communication device is connected to a monitoring server via the external network, and in operation (C), a result of determination made in operation (B) is transmitted to the monitoring server.

13. The anomaly detection electronic control unit according to claim 1, wherein in operation (B), when the communicator has not received at least one of the first communication message or the second communication message, the level of anomaly possibility of the first communication message is determined to be higher than when the communicator receives both the first communication message and the second communication message.

14. An in-vehicle network system, comprising:

a plurality of electronic control units communicating via an in-vehicle network; and an anomaly detection electronic control unit connected to the in-vehicle network, wherein the plurality of electronic control units includes a first electronic control unit, a second electronic control unit, a third electronic control unit, and an external communication device communicating with an external network, the first electronic control unit transmits, to the in-vehicle network, a first communication message indicating speed information of a vehicle including the in-vehicle network, the external communication device transmits, to the in-vehicle network, an external message received from the external network, the second electronic control unit transmits, to the in-vehicle network, a second communication message indicating peripheral information of the vehicle, the third electronic control unit holds, when receiving the first communication message, a value of the first communication message, and performs, when receiving the external message, processing appropriate to the external message in accordance with the value of the first communication message held, and the anomaly detection electronic control unit includes:

a communicator that receives the first communication message and the second communication message;

a processor; and a memory including at least one set of instructions that, when executed by the processor causes the processor to perform operations including:

(A) determining a first traveling state of the vehicle based on the speed information and a second traveling state of the vehicle based on the peripheral information;

(B) determining, by comparing the first traveling state with the second traveling state, that the first communication message is anomalous when the first traveling state is different from the second traveling state and that the first communication message is normal when the first traveling state is same as the second traveling state; and (C) executing processing to handle an anomaly when the first communication message is determined to be anomalous.

15. An anomaly detection method performed by an anomaly detection electronic control unit connected to an in-vehicle network used by a plurality of electronic control units for communication, the anomaly detection method comprising:

receiving a first communication message indicating speed information of a vehicle including the in-vehicle network and a second communication message indicating peripheral information of the vehicle;

determining a first traveling state of the vehicle based on the speed information and a second traveling state of the vehicle based on the peripheral information;

determining, by comparing the first traveling state with the second traveling state, that the first communication message is anomalous when the first traveling state is different from the second traveling state and that the first communication message is normal when the first traveling state is same as the second traveling state; and executing processing to handle an anomaly when the first communication message is determined to be anomalous.

* * * * *